(12) United States Patent
Li et al.

(10) Patent No.: US 8,165,249 B2
(45) Date of Patent: Apr. 24, 2012

(54) APPARATUS AND METHOD FOR ESTIMATING AND COMPENSATING TIME OFFSET AND/OR CARRIER FREQUENCY OFFSET IN MIMO SYSTEM BASED OFDM/OFDMA

(75) Inventors: Zheng Zi Li, Seongnam-si (KR); Byung-Chul Kim, Yongin-si (KR); Sang-Bae Ji, Yongin-si (KR)

(73) Assignee: Seah Networks Co., Ltd., Seoul (KR)

( * ) Notice: Subject to any disclaimer, the term of this patent is extended or adjusted under 35 U.S.C. 154(b) by 571 days.

(21) Appl. No.: 12/439,514

(22) PCT Filed: Aug. 30, 2007

(86) PCT No.: PCT/KR2007/004194
§ 371 (c)(1),
(2), (4) Date: Feb. 27, 2009

(87) PCT Pub. No.: WO2008/026891
PCT Pub. Date: Mar. 6, 2008

(65) Prior Publication Data
US 2010/0008216 A1    Jan. 14, 2010

(30) Foreign Application Priority Data

Aug. 30, 2006 (KR) ............ 10-2006-0082844
Sep. 21, 2006 (KR) ............ 10-2006-0091761
Oct. 25, 2006 (KR) ............ 10-2006-0104108

(51) Int. Cl.
*H04L 27/06* (2006.01)
(52) U.S. Cl. ........ 375/344; 375/260; 375/267; 375/299; 375/340; 375/343; 375/347; 375/349; 375/354; 375/371; 455/101; 455/132; 455/296; 455/500; 455/502; 455/562.1; 370/208; 370/334; 370/503; 370/508; 370/509; 370/510; 370/511; 370/512; 370/513; 370/514

(58) Field of Classification Search ............ 375/260, 375/267, 299, 340, 343, 344, 347, 349, 354, 375/371; 455/101, 132, 296, 500, 562.1, 455/502; 370/208, 334, 503, 508, 509, 510, 370/511, 512, 513, 514
See application file for complete search history.

(56) References Cited

U.S. PATENT DOCUMENTS
2004/0156349 A1   8/2004 Borisovich et al.

FOREIGN PATENT DOCUMENTS
WO     WO 03/034644 A1    4/2003

OTHER PUBLICATIONS

Sok-Kyu Lee et al "High Accuracy and Low Complexity Timing Offset Estimation for MIMO-OFDM Receivers" April WCNC 2006 Proceedings.*

(Continued)

*Primary Examiner* — Leon Flores

(57) ABSTRACT

The present invention relates to an apparatus and method for estimating and compensating for a time offset and a carrier frequency offset in a Multiple Input Multiple Output (MIMO) communication system that supports Orthogonal Frequency Division Multiplexing (OFDM) or Orthogonal Frequency Division Multiplexing Access (OFDMA). According to the present invention, a phase difference of pilot signals of the same transmitting antenna, which are received through receiving antennas, is calculated. An arc tangent operation is then carried out on the phase difference of the pilot signals to calculate a time offset linear phase and/or a carrier frequency offset linear phase. Further, a time offset compensation value and/or a carrier frequency offset compensation value are found by employing the time offset linear phase and/or the carrier frequency offset linear phase. A time offset and/or a carrier frequency offset with respect to pilots and data are compensated for by employing the time offset compensation value and/or the carrier frequency offset compensation value.

20 Claims, 13 Drawing Sheets

OTHER PUBLICATIONS

Chin Wee Yak et al., "Timing synchronization and frequency offset estimation for Ultra-Wideband (UWB) Multi-Band OFDM systems," 2005 IEEE 16$^{th}$ International Symposium on Personal, Indoor and Mobile Radio Communications, pp. 471-475.

International Search Report for application No. PCT/KR2007/004194 filed Aug. 30, 2007.

Written Opinion of the International Searching Authority for application No. PCT/KR2007/004194 filed Aug. 30, 2007.

* cited by examiner

[Fig. 1]
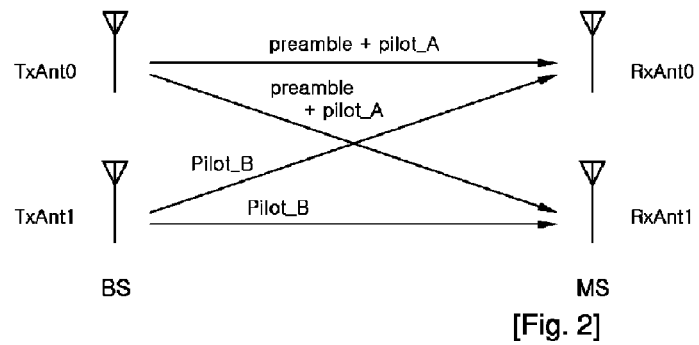
[Fig. 2]
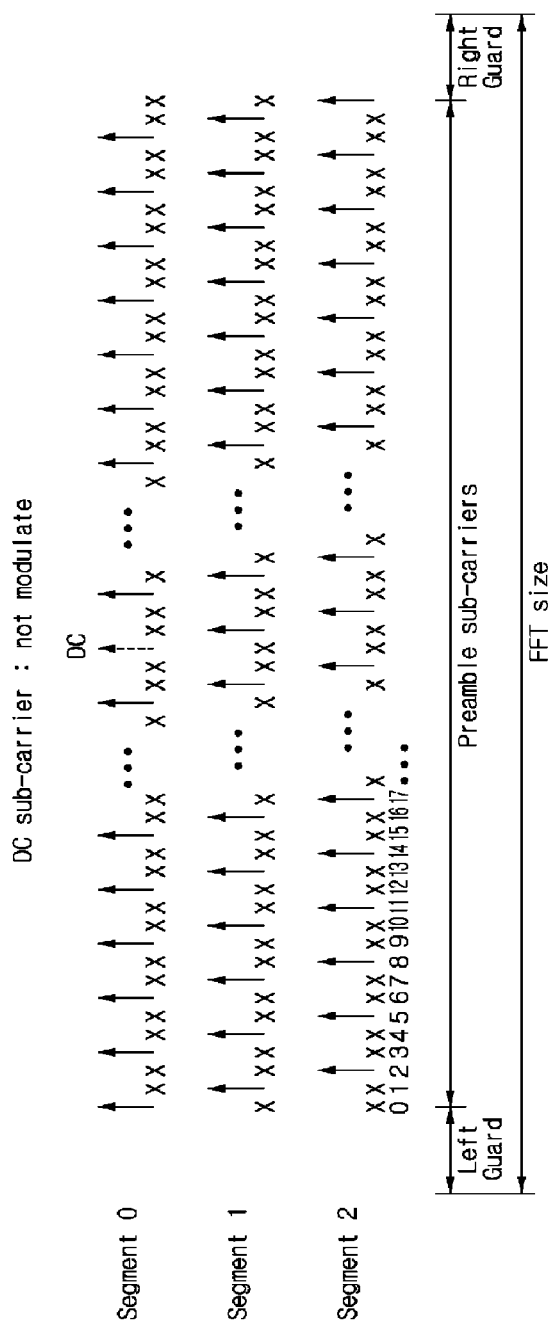

[Fig. 3]
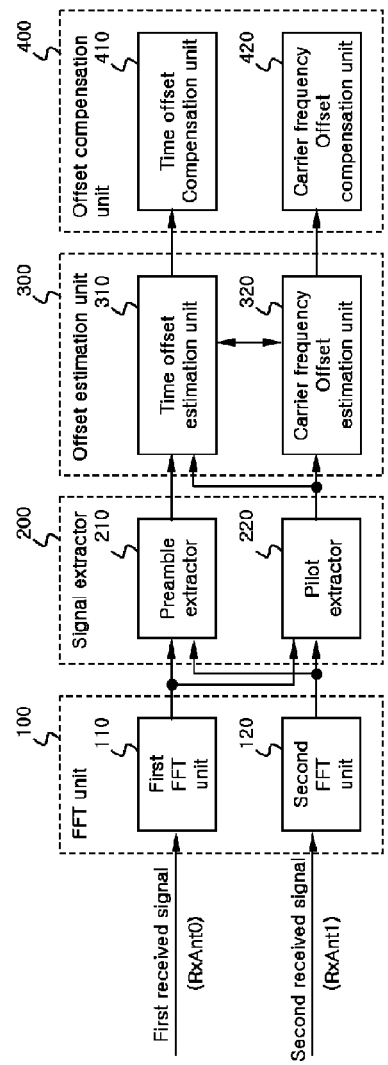
[Fig. 4]
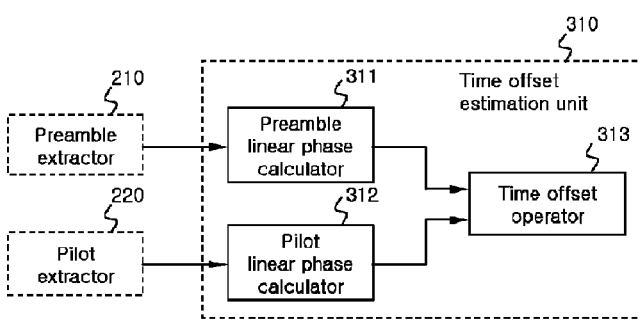
[Fig. 5]
311
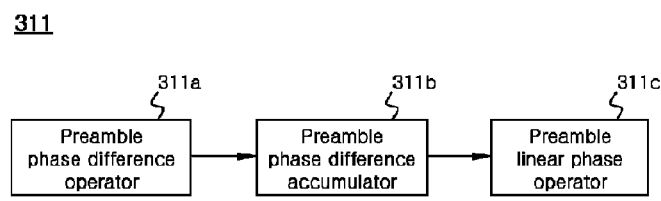

[Fig. 6]
312
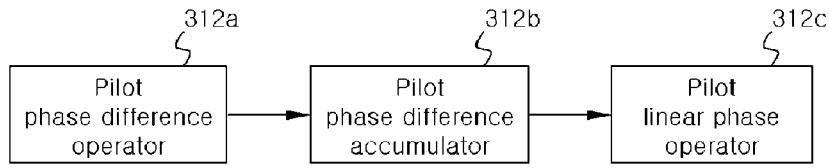
[Fig. 7]
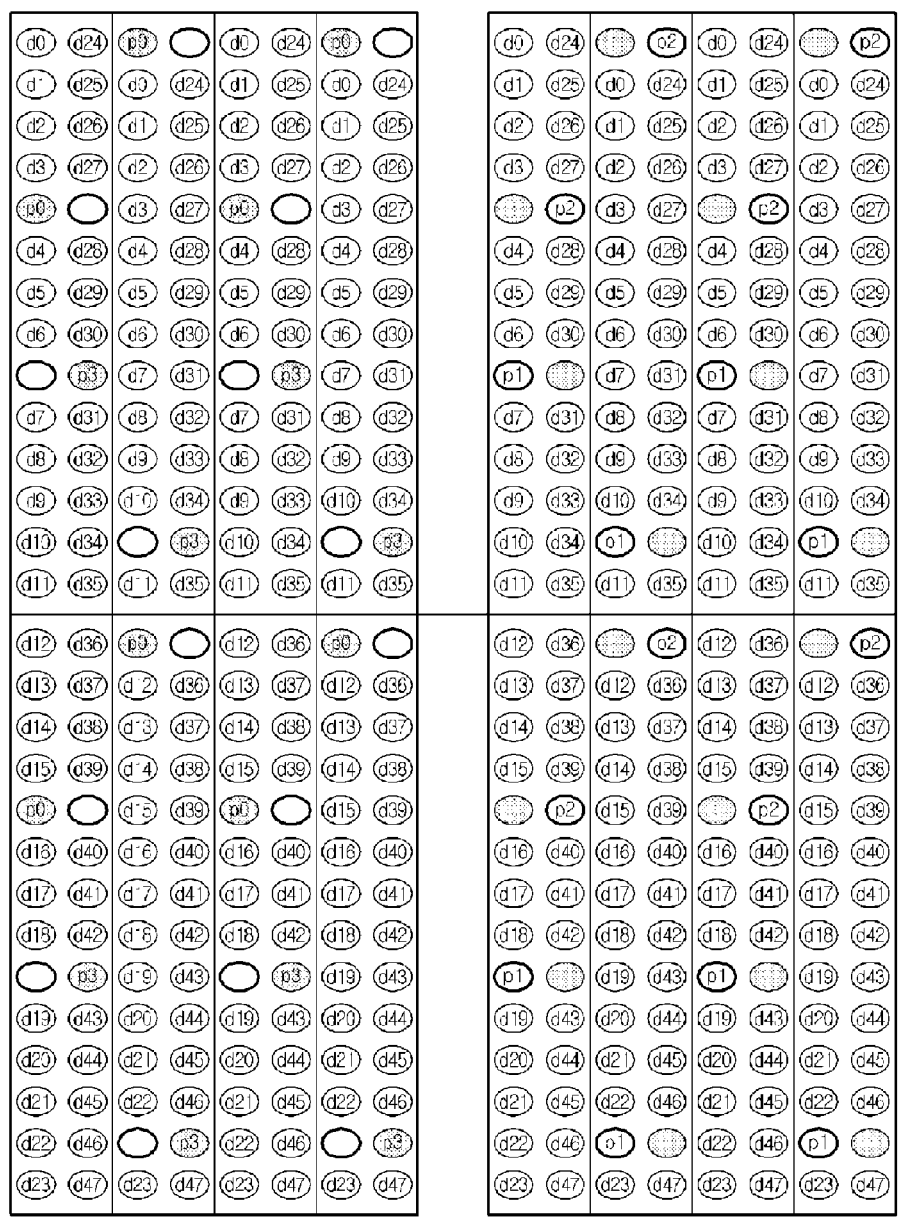
| ○ | Pilot carrier of TxAnt0 | ◌ | Null carrier |
| ○ | Null carrier | ○ | Pilot carrier of TxAnt1 |
| ○ | Data carrier | ○ | Data carrier |

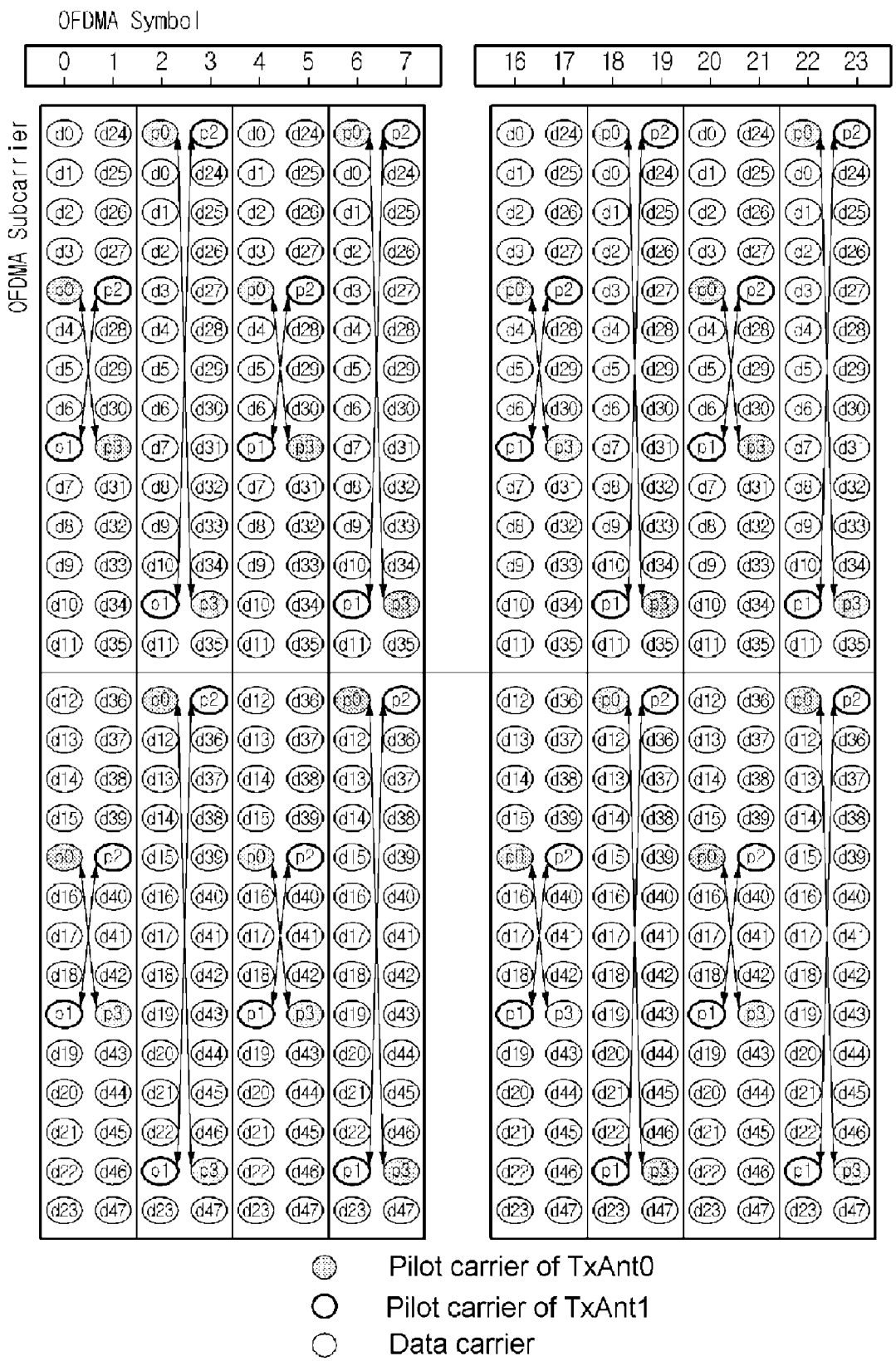
[Fig. 8]

[Fig. 9]
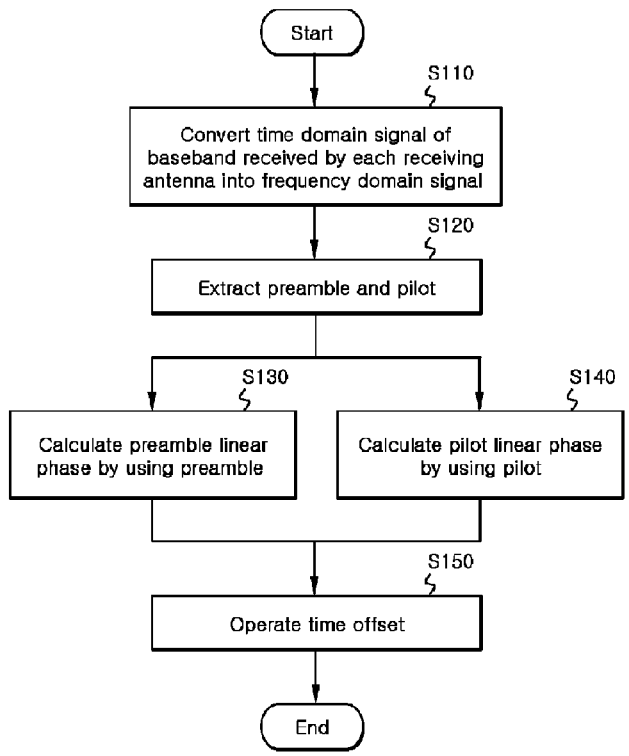
[Fig. 10]
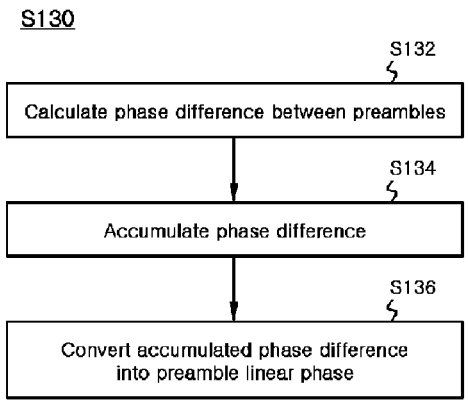
[Fig. 11]
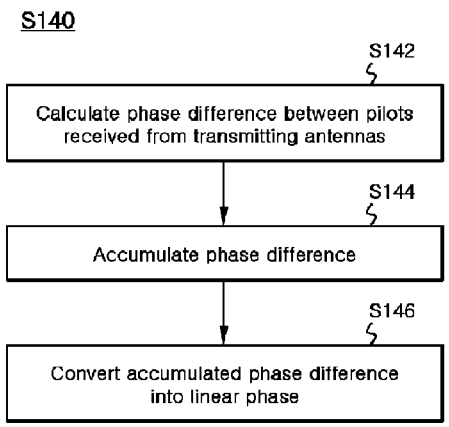

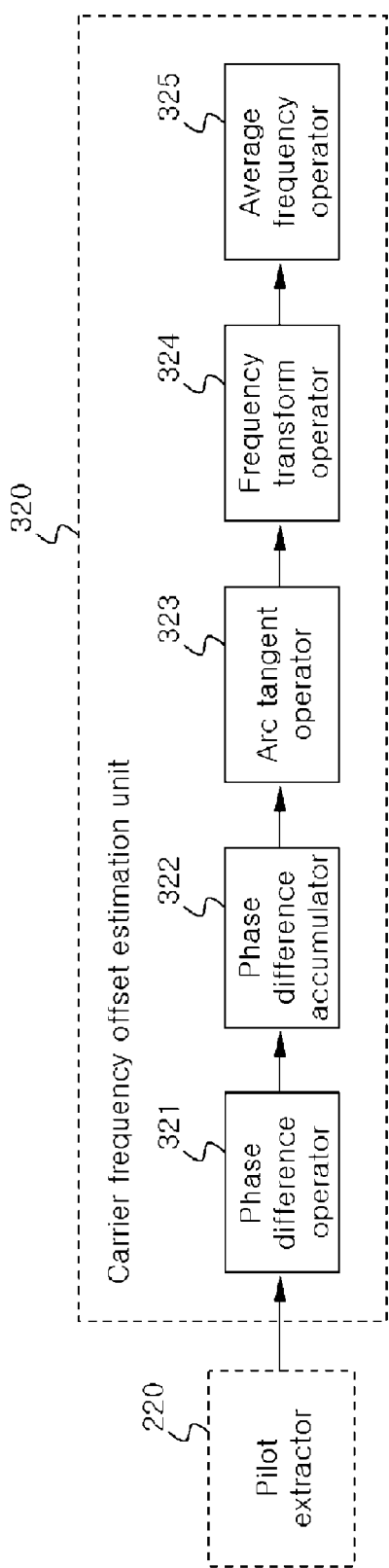
[Fig. 12]

[Fig. 13]
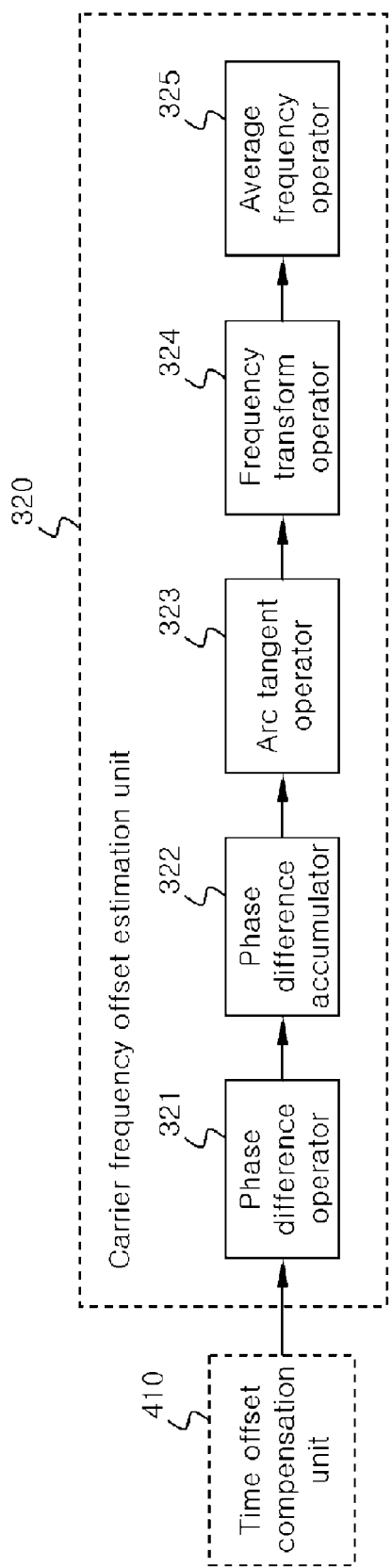

[Fig. 14]
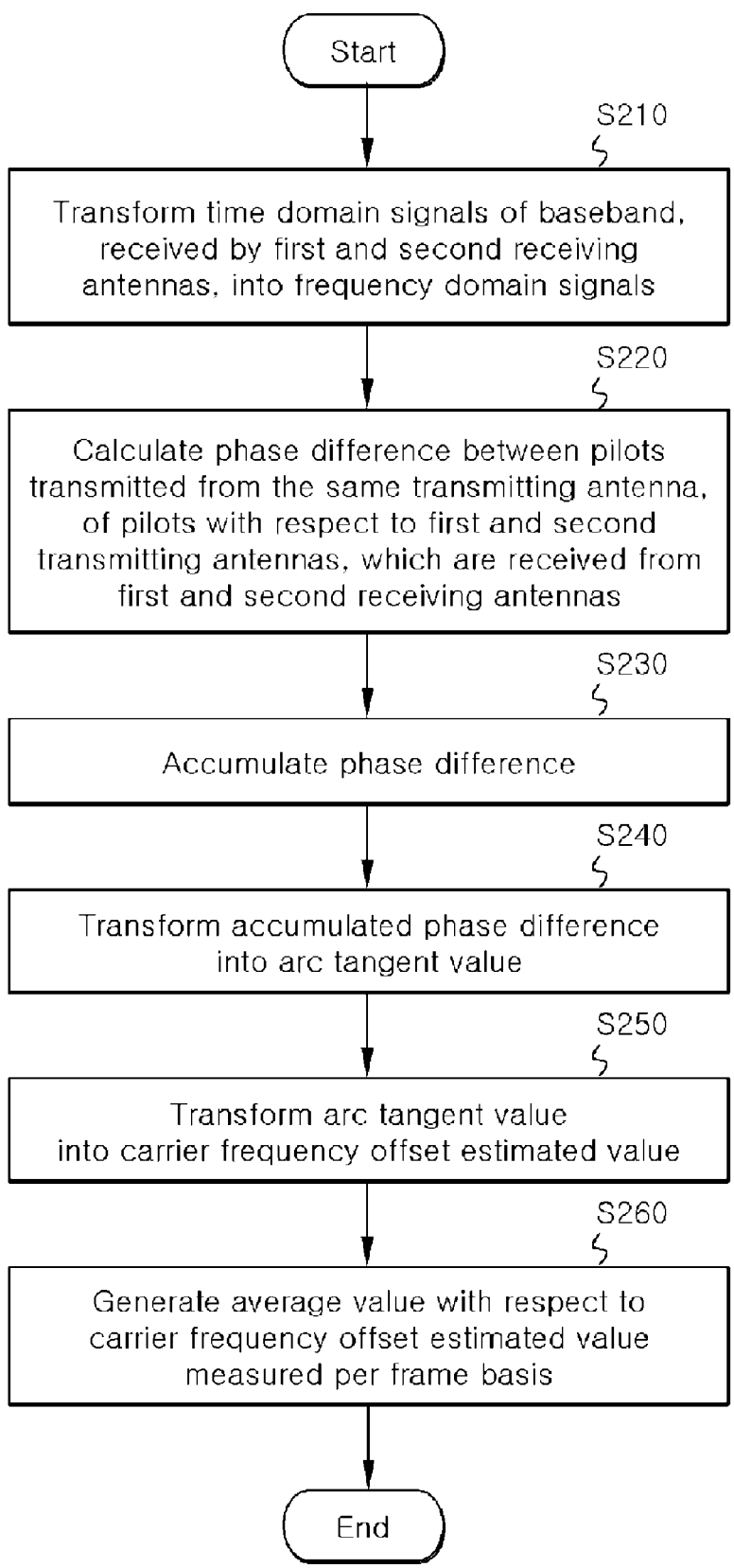

[Fig. 15]
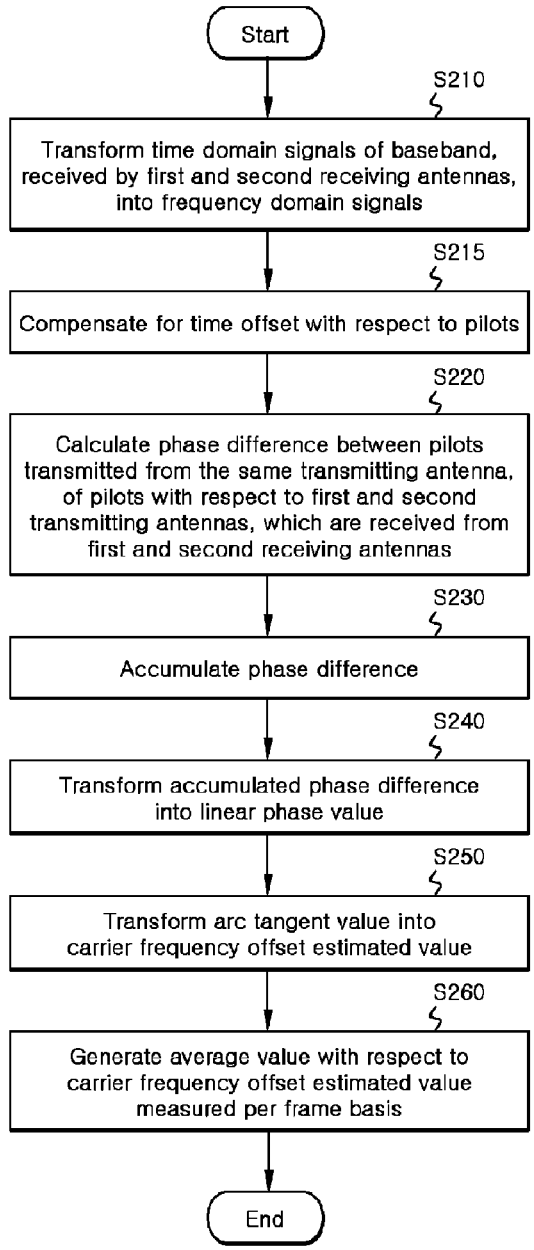
[Fig. 16]
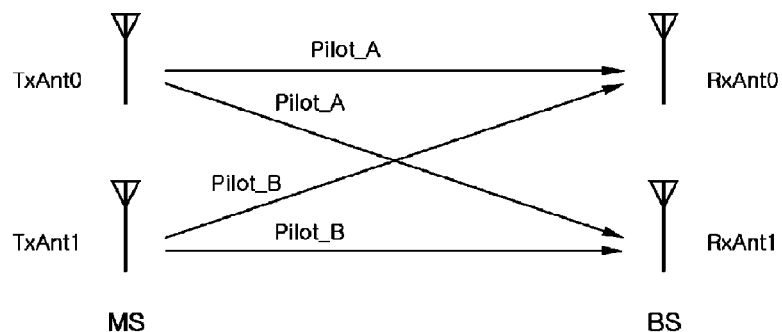

[Fig. 17]
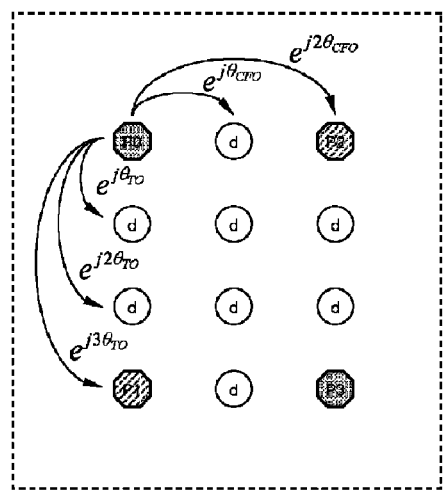
(a)
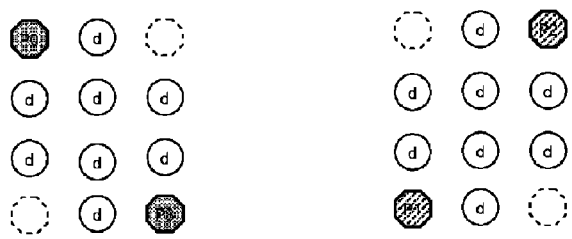
TxAnt0 (pilot_A)　　　　TxAnt1 (pilot_B)
(b)
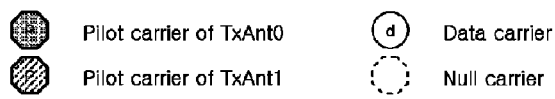
[Fig. 18]
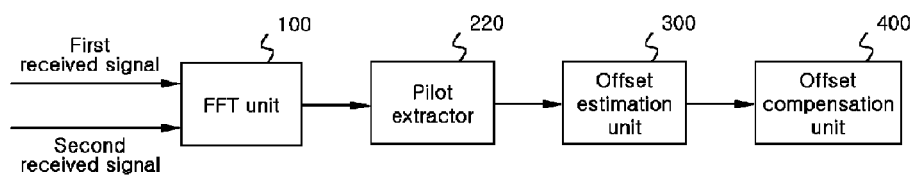
[Fig. 19]
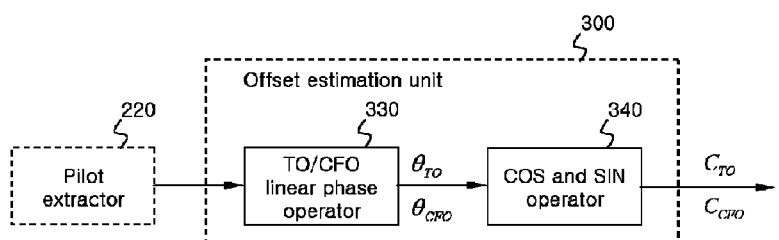

[Fig. 20]
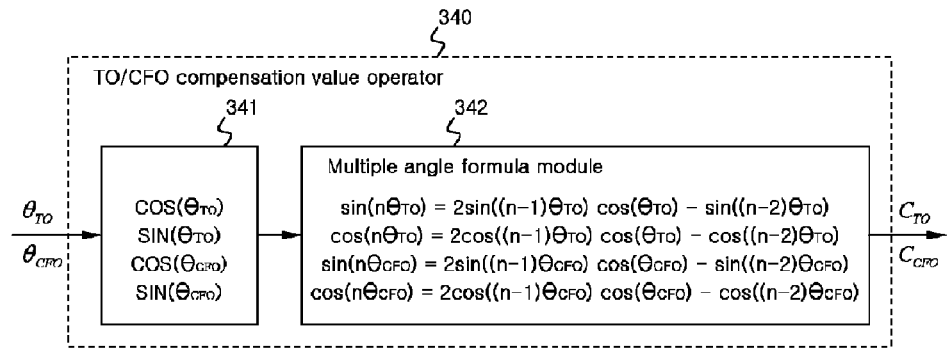
[Fig. 21]
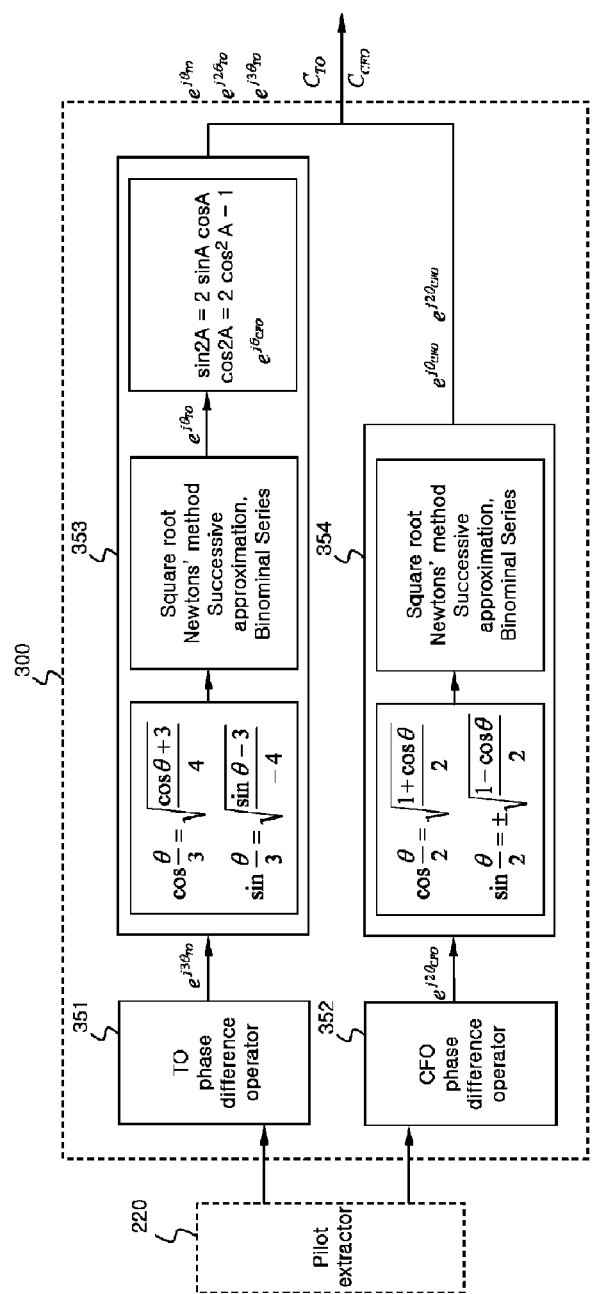

[Fig. 22]
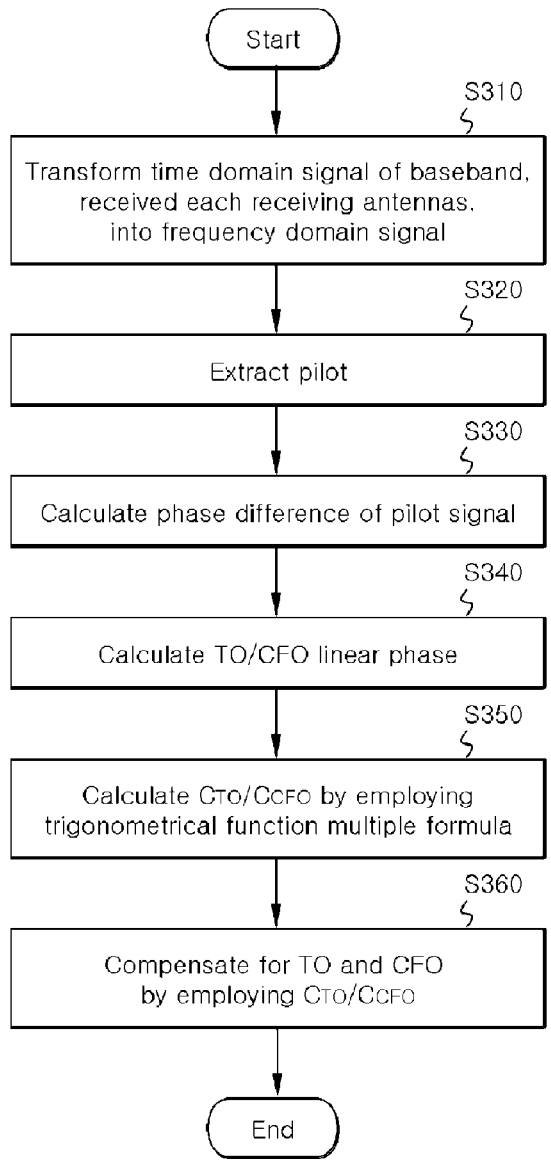
[Fig. 23]
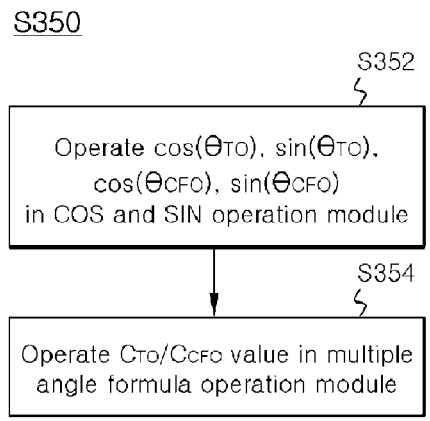

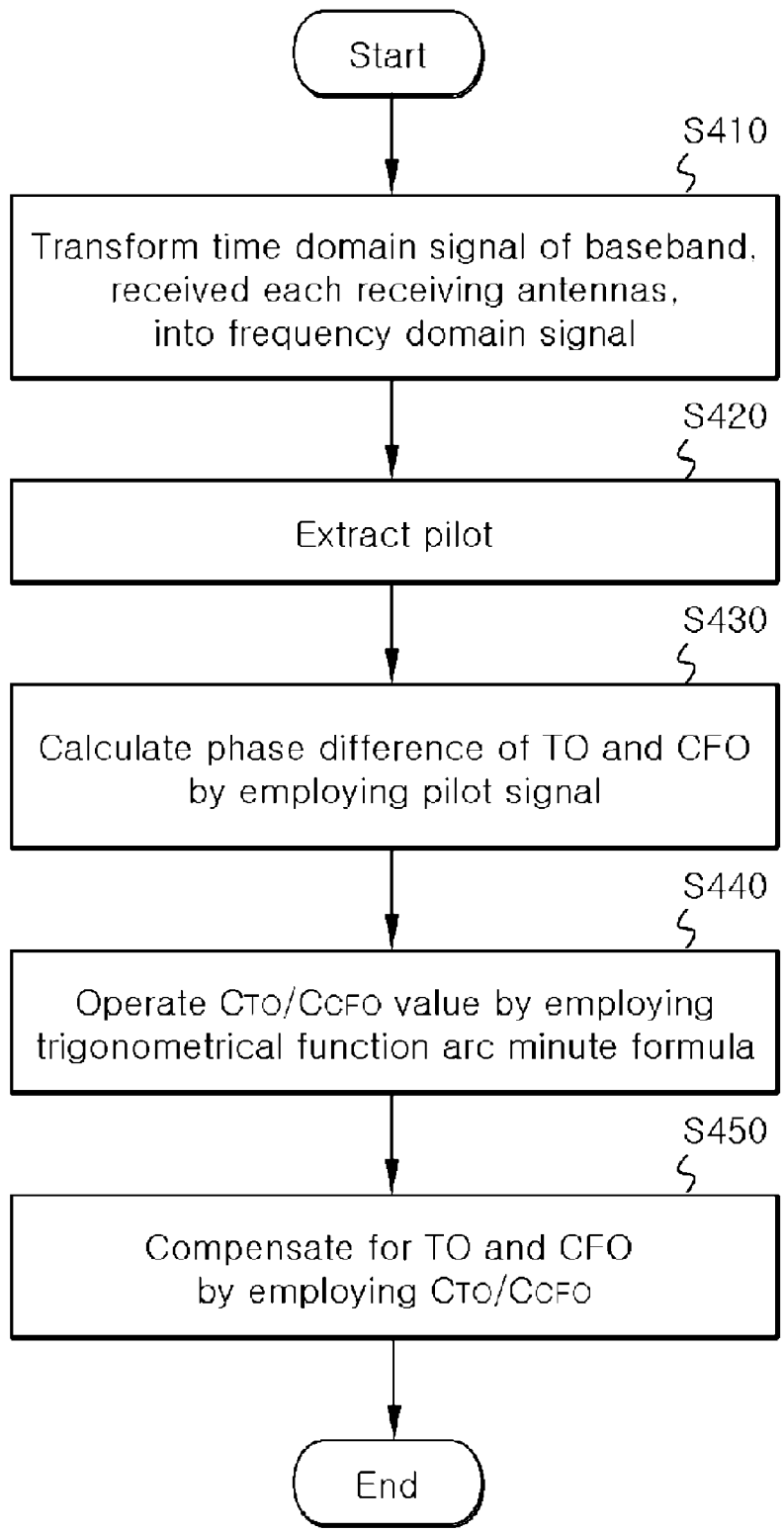
[Fig. 24]

_US 8,165,249 B2_

APPARATUS AND METHOD FOR ESTIMATING AND COMPENSATING TIME OFFSET AND/OR CARRIER FREQUENCY OFFSET IN MIMO SYSTEM BASED OFDM/OFDMA

TECHNICAL FIELD

The present invention relates to an apparatus and method for estimating and compensating for a time offset and/or a carrier frequency offset in a Multiple Input Multiple Output (MIMO) communication system, and more particularly, to an apparatus and method for estimating and compensating for a time offset and/or a carrier frequency offset in a MIMO wireless communication system in which IEEE 802.16d/e, WiBro, and WiMAX standard specifications are used and Orthogonal Frequency Division Multiplexing (OFDM) or Orthogonal Frequency Division Multiplexing Access (OFDMA) is supported.

BACKGROUND ART

In a wireless communication system that supports IEEE 802.16d/e, WiBro, and WiMAX standard specifications, the characteristics of a channel formed between a base station and a terminal needs to be known for a smooth communication therebetween. To this end, synchronization must be first established between the base station and the terminal and the operation of an oscillator also must be accurate. However, on the part of a receiving side, a time offset and a carrier frequency offset are generated due to various factors, such as a multi-path characteristic between a transmitting side and a receiving side, and a time-varying characteristic occurring as terminals or radio wave obstacles move. It may result in a degraded reception performance on the part of the receiving side. It is therefore necessary for the receiving side to consistently estimate a time offset and a carrier frequency offset and compensate for the time offset and the carrier frequency offset according to an estimate result.

DISCLOSURE OF INVENTION

Technical Problem

Accordingly, the present invention has been made in view of the above problems occurring in the prior art, and an object of the present invention is to provide a time offset estimation apparatus in which a time offset estimated value can be calculated in a multiple input multiple output communication system and a method thereof.

Another object of the present invention is to provide a carrier frequency offset estimation apparatus in which a carrier frequency offset estimated value can be calculated in a multiple input multiple output communication system and a method thereof.

Still another object of the present invention is to provide a time offset and the carrier frequency offset compensation apparatus in which a time offset and carrier frequency offset can be estimated and compensated for in a Partial Usage of Sub-channels (PUSC) mode in a multiple input multiple output communication system and a method thereof.

Technical Solution

For the above objects, according to an aspect of the present invention, there is provided an apparatus for estimating a time offset in a MIMO communication system that supports OFDM or OFDMA, which includes a preamble linear phase calculator for calculating a preamble linear phase by employing a preamble included in a received signal frame of each of a plurality of receiving antennas; a pilot linear phase calculator for receiving signals transmitted from a plurality of transmitting antennas using different pilot patterns through the plurality of receiving antennas, and calculating a pilot linear phase by employing the pilot patterns of the plurality of transmitting antennas, which are received from the receiving antennas, respectively; and a time offset operator for calculating a time offset by employing the calculated preamble linear phase and the calculated pilot linear phase.

According to another aspect of the present invention, the apparatus for estimating a frequency offset in a MIMO communication system that supports OFDM or OFDMA includes a phase difference operator for receiving signals transmitted from a plurality of transmitting antennas, which employ different pilot patterns, through a plurality of receiving antennas, respectively, and calculating a phase difference between pilots transmitted from the same transmitting antenna, of pilots of a pilot transmission unit of a frame transmitted from the plurality of transmitting antenna, which are received from the receiving antennas, respectively; a phase difference accumulator for accumulating the phase difference to generate a phase difference accumulated value; and a frequency offset operator for converting the phase difference accumulated value into a carrier frequency offset estimated value.

According to a further aspect of the present invention, there is provided an apparatus for compensating for a time offset and a carrier frequency offset in an OFDM communication system, which includes a pilot signal phase difference operator for calculating a phase difference of a pilot signal from a received signal; a time offset and carrier frequency offset linear phase operator for carrying out an operation on a phase of the pilot signal to calculate a time offset linear phase and a carrier frequency offset linear phase; and a time offset and carrier frequency offset compensation value operator for carrying out an operation on the time offset linear phase and the carrier frequency offset linear phase to calculate a time offset compensation value and a carrier frequency offset compensation value.

According to a still further aspect of the present invention, there is provided a method of estimating a time offset in a MIMO communication system that supports OFDM or OFDMA, which includes the steps of calculating a preamble linear phase by employing a preamble included in a received signal frame of each of a plurality of receiving antennas; receiving signals transmitted from a plurality of transmitting antennas using different pilot patterns through the plurality of receiving antennas, and calculating a pilot linear phase by employing the pilot patterns of the plurality of transmitting antennas, which are received from the receiving antennas, respectively; and calculating a time offset by employing the calculated preamble linear phase and the calculated pilot linear phase.

According to a still further aspect of the present invention, the method of estimating a frequency offset in a MIMO communication system that supports OFDM or OFDMA, including the steps of receiving signals transmitted from a plurality of transmitting antennas, which employ different pilot patterns, through a plurality of receiving antennas, respectively, and calculating a phase difference between pilots transmitted from the same transmitting antenna, of pilots of a pilot transmission unit of a frame transmitted from the plurality of transmitting antenna, which are received from the receiving antennas, respectively; accumulating the phase difference to generate a phase difference accumulated value;

and converting the phase difference accumulated value into a carrier frequency offset estimated value.

According to a still further aspect of the present invention, there is provided a method of compensating for a time offset and a carrier frequency offset in an OFDM communication system, which includes the steps of calculating a phase difference of a pilot signal in a received signal; carrying out an operation on the phase difference of the pilot signal to calculate a time offset linear phase and a carrier frequency offset linear phase; and carrying out an operation on the time offset linear phase and the carrier frequency offset linear phase to calculate a time offset compensation value and a carrier frequency offset compensation value.

Advantageous Effects

The apparatus and method for estimating a time offset according to the present invention can calculate a time offset estimated value for compensating for a pilot and a data phase by employing a preamble and a pilot.

The apparatus and method for estimating a carrier frequency offset according to the present invention can calculate a carrier frequency offset estimated value by employing a phase difference between pilots received from the same transmitting antenna, of pilots with respect to transmitting antennas, which are received by a receiving antenna, in a multiple input multiple output communication system.

The apparatus and method for compensating for a time offset and a carrier frequency offset according to the present invention can improve the reception performance by estimating and compensating for a time offset and/or a carrier frequency offset in a PUSC mode in a multiple input/output communication system.

BRIEF DESCRIPTION OF THE DRAWINGS

FIG. 1 is a view illustrating the concept of a downlink 2×2 MIMO system to which a time offset/carrier frequency offset estimation and compensation apparatus according to the present invention can be applied;

FIG. 2 is a view illustrating a transmission structure of a preamble by segments according to the present invention;

FIG. 3 shows the construction of the time offset/carrier frequency offset estimation and compensation apparatus according to an embodiment of the present invention;

FIG. 4 is a detailed construction of an embodiment of a time offset estimation unit shown in FIG. 3;

FIG. 5 is a detailed construction of an embodiment of a preamble linear phase calculator shown in FIG. 4;

FIG. 6 is a detailed construction of an embodiment of a pilot linear phase calculator shown in FIG. 4;

FIG. 7 is a view illustrating pilot patterns of a DL (Downlink) PUSC mode in the 2×2 MIMO;

FIG. 8 is an exemplary view of an OFDMA symbol and an OFDMA sub-carrier in the DL PUSC mode according to the present invention;

FIG. 9 is a flowchart illustrating a time offset estimation method according to an embodiment of the present invention;

FIG. 10 is a detailed operational flowchart of step S130 of FIG. 9;

FIG. 11 is a detailed operational flowchart of step S140 of FIG. 9;

FIG. 12 is a detailed construction of an embodiment of a carrier frequency offset estimation unit shown in FIG. 3;

FIG. 13 is a detailed construction of another embodiment of the carrier frequency offset estimation unit shown in FIG. 3;

FIG. 14 is a flowchart illustrating a carrier frequency offset estimation method according to an embodiment of the present invention;

FIG. 15 is a flowchart illustrating a carrier frequency offset estimation method according to another embodiment of the present invention;

FIG. 16 is a view illustrating the concept of an uplink 2×2 MIMO system to which the time offset/carrier frequency offset estimation and compensation apparatus according to the present invention can be applied;

FIG. 17 is a view illustrating pilot patterns of a UL (Uplink) PUSC mode in the 2×2 MIMO;

FIG. 18 shows the construction of a time offset/carrier frequency offset estimation and compensation apparatus according to another embodiment of the present invention;

FIG. 19 is a detailed construction of an embodiment of an offset estimation unit shown in FIG. 18;

FIG. 20 is a detailed construction of an embodiment of a COS and SIN operator shown in FIG. 19;

FIG. 21 is a detailed construction of another embodiment of an offset estimation unit shown in FIG. 18;

FIG. 22 is a flowchart illustrating a time offset/carrier frequency offset estimation and compensation method according to an embodiment of the present invention;

FIG. 23 is a detailed operational flowchart illustrating an embodiment of step S350 shown in FIG. 22; and FIG. 24 is a flowchart illustrating a time offset/carrier frequency offset estimation and compensation method according to another embodiment of the present invention.

MODE FOR THE INVENTION

Hereinafter, exemplary embodiments of the present invention will be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

Before a detailed description, the term "communication terminal" used in this specification refers to a communication terminal that supports an OFDM scheme or an OFDMA scheme, preferably, a communication terminal that supports PUSC, Full Usage of Sub-Channels (FUSC), and Band Adaptation Modulation Coding (AMC) channel modes in a wireless communication system that uses IEEE 802.16d/e, WiBro, and WiMAX standard specifications. Further, only the PUSC channel mode is described in the detailed description of the present invention. However, the present invention may also be applied to the FUSC and Band AMC channel modes.

Further, the term "wireless communication system" used in this specification may refer to a system based on one of IEEE 802.16d/e standard, WiBro, and WiMAX.

Further, the term "symbol" used in this specification refers to an OFDMA or OFDM symbol.

MIMO system to which a time offset/carrier frequency offset estimation and compensation apparatus according to the present invention can be applied, and illustrates a 2×2 MIMO.

Referring to FIG. 1, a base station BS, that is, a transmitting side of a wireless communication system transmits a preamble through an antenna of two transmitting antennas TxAnt0, TxAnt1, and a communication terminal MS receives received signals through two receiving antennas RxAnt0, RxAnt1, respectively. Meanwhile, pilot signals are respectively transmitted from the two transmitting antennas and are received by the two receiving antennas.

FIG. 2 according to the present invention. As shown in FIG. 2, guards for reducing the interference of neighboring frequency bands are configured on the right and left sides of a plurality of sub-carriers, and a DC sub-carrier, that is, a null sub-carrier is configured.

Further, within one segment, a preamble sub-carrier is positioned at a pre-determined distance ('3' in FIG. 2), and it can be used for initial synchronization, cell search, frequency offset, and channel estimation. Furthermore, a preamble signal has a higher signal level than that of a data signal and a pilot signal, and is advantageous for signal acquisition under adverse channel conditions.

The present invention will be hereinafter described with reference to only 2×2 MIMO. For example, the present invention will be described with reference to the structure of a wireless communication system in which a communication terminal includes two receiving antennas and signals are received from two transmitting antennas included in a base station. However, 2×2 MIMO is only an embodiment of the present invention and is not limited thereto.

FIG. 3 shows the construction of a time offset/carrier frequency offset estimation and compensation apparatus according to an embodiment of the present invention. For reference, the present embodiment is of a kind in which a signal of a DL PUSC mode, which is transmitted from a base station, is received by a communication terminal, and a time offset and a carrier frequency offset are estimated.

Referring to FIG. 3, the time offset/carrier frequency offset estimation and compensation apparatus according to the present invention includes a Fast Fourier Transform (FFT) unit 100, a signal extractor 200, an offset estimation unit 300, an offset compensation unit 400 and so on.

The FFT unit 100 may comprise a first FFT unit 110 and a second FFT unit 120, which are separated from each other. The first and second FFT units 110, 120 transform a time domain into a frequency domain by performing FFT on received signals (a first received signal and a second received signal) of a baseband, which are respectively received through a first receiving antenna and a second receiving antenna of the communication terminal. The time domain signals of the baseband, received through the first receiving antenna and the second receiving antenna, can be transformed into the frequency domain through the first FFT unit 110 and the second FFT unit 120, respectively, but may be transformed into the frequency domain through only one FFT unit.

The transformed received signals, respectively, include a preamble signal, a pilot signal, a data signal and the like, which are then separated and extracted in the signal extractor 200. In other words, a preamble extractor 210 extracts preambles from the first and second received signals, transformed into the frequency domain, and transmits the preambles to the offset estimation unit 300. A pilot extractor 220 extracts pilots from the first and second received signals, transformed into the frequency domain, and transmits the pilots to the offset estimation unit 300. In this case, pilots transmitted from two transmitting antennas, which are included in the received signals, have different pilot patterns.

A time offset estimation unit according to the present invention is described in detail below with reference to FIGS. 4 to 11.

As shown in FIG. 4, a time offset estimation unit 310 includes a preamble linear phase calculator 311, a pilot linear phase calculator 312, and a time offset operator 313.

The preamble linear phase calculator 311 calculates a preamble linear phase on the basis of the preamble extracted by the preamble extractor 210. The pilot linear phase calculator 312 calculates a pilot linear phase by employing pilots transmitted from the same transmitting antenna, of the pilots, which are transmitted from the two transmitting antennas and extracted by the pilot extractor 220. Further, the time offset operator 313 operates a time offset by employing the linear phases calculated by the preamble linear phase calculator 311 and the pilot linear phase calculator 312. The time offset calculated as described above is used to compensate for a phase variation of a pilot and data according to a time offset in a time offset compensation unit 410.

FIG. 5 is a detailed construction of an embodiment of the preamble linear phase calculator shown in FIG. 4.

Referring to FIG. 5, the preamble linear phase calculator 311 includes a preamble phase difference operator 311a, a preamble phase difference accumulator 311b, and a preamble linear phase operator 311c.

The preamble phase difference operator 311a may be implemented by using first and second preamble phase difference operators (not shown). The first and second preamble phase difference operators calculate phase differences of the preambles, which are respectively included in the received signals transformed in the first and second FFT units 110 and 120. Each of the first and second preamble phase difference operators can output a value in which a calculated phase difference is multiplied by a predetermined preamble weight. The preamble weight may have a different value per receiving-antenna basis. It has been described above that the preamble phase difference operator 311a consists of the first and second preamble phase difference operators, which, respectively, calculate phase differences of preambles included in received signals. However, the preamble phase difference operator 311a may include one function unit, and the function unit may receive the two received signals and output a value to which the phase differences of the preambles included in the two received signals are added.

The preamble phase difference accumulator 311b may be implemented by using first and second preamble phase difference accumulators (not shown). The first and second preamble phase difference accumulators accumulate the phase differences, respectively, calculated in the first and second preamble phase difference operators, and accumulate phase differences. The preamble phase difference accumulator 311b may include one function unit instead of the two preamble phase difference accumulators and output a value to which the two phase difference accumulated values are added.

The preamble linear phase operator 311c converts the accumulated phase difference accumulated values, which are generated with respect to respective preambles, into preamble linear phases. The preamble linear phase operator 311c converts the phase difference accumulated values into the preamble linear phases by carrying out an arc tangent operation on the phase difference accumulated values, which are respectively generated by the first and second preamble phase difference accumulators. The preamble linear phase operator 311c may include a lookup table in which a phase difference accumulated value and a preamble linear phase (an arc tangent value) corresponding to the phase difference accumulated value are recorded, and may transform the phase difference accumulated value into the preamble linear phase by reference to the lookup table.

The preamble linear phase calculator 311 constructed as above can find a preamble linear phase $\theta_{TO\_pre}$ by employing [Equation 1] or [Equation 2] when the preamble signal shown in FIG. 2 is received.

$$\theta_{TO\_pre} = \begin{cases} \dfrac{1}{6}\tan^{-1}\dfrac{\mathrm{Im}\left\{\sum\limits_{k=0}^{139}\sum\limits_{m=0}^{1} p_k(m)\cdot p_{k+2}(m)^*\cdot W0(m) + \sum\limits_{k=143}^{281}\sum\limits_{m=0}^{1} p_k(m)\cdot p_{k+2}(m)^*\cdot W0(m)\right\}}{\mathrm{Re}\left\{\sum\limits_{k=0}^{139}\sum\limits_{m=0}^{1} p_k(m)\cdot p_{k-2}(m)^*\cdot W0(m) + \sum\limits_{k=143}^{281}\sum\limits_{m=0}^{1} p_k(m)\cdot p_{k+2}(m)^*\cdot W0(m)\right\}} & \text{for Segment 0} \\[2em] \dfrac{1}{6}\tan^{-1}\dfrac{\mathrm{Im}\left\{\sum\limits_{k=0}^{139}\sum\limits_{m=0}^{1} p_k(m)\cdot p_{k+2}(m)^*\cdot W0(m) + \sum\limits_{k=142}^{281}\sum\limits_{m=0}^{1} p_k(m)\cdot p_{k+2}(m)^*\cdot W0(m)\right\}}{\mathrm{Re}\left\{\sum\limits_{k=0}^{139}\sum\limits_{m=0}^{1} p_k(m)\cdot p_{k-2}(m)^*\cdot W0(m) + \sum\limits_{k=142}^{281}\sum\limits_{m=0}^{1} p_k(m)\cdot p_{k+2}(m)^*\cdot W0(m)\right\}} & \text{for otherwise} \end{cases}$$

[Equation 1]

$$\theta_{TO\_pre} = \begin{cases} \frac{1}{2}\left[\frac{1}{6}\tan^{-1}\frac{\mathrm{Im}\left\{\sum_{k=0}^{139} p_k(0)\cdot p_{k+2}(0)^*\cdot W0(0) + \sum_{k=143}^{281} p_k(0)\cdot p_{k+2}(0)^*\cdot W0(0)\right\}}{\mathrm{Re}\left\{\sum_{k=0}^{139} p_k(0)\cdot p_{k+2}(0)^*\cdot W0(0) + \sum_{k=143}^{281} p_k(0)\cdot p_{k+2}(0)^*\cdot W0(0)\right\}} + \frac{1}{6}\tan^{-1}\frac{\mathrm{Im}\left\{\sum_{k=0}^{139} p_k(1)\cdot p_{k+2}(1)^*\cdot W0(1) + \sum_{k=143}^{281} p_k(1)\cdot p_{k+2}(1)^*\cdot W0(1)\right\}}{\mathrm{Re}\left\{\sum_{k=0}^{139} p_k(1)\cdot p_{k+2}(1)^*\cdot W0(1) + \sum_{k=143}^{281} p_k(1)\cdot p_{k+2}(1)^*\cdot W0(1)\right\}}\right] & \text{for Segment0} \\[2em] \frac{1}{2}\left[\frac{1}{6}\tan^{-1}\left(\frac{\mathrm{Im}\left\{\sum_{k=0}^{139} p_k(0)\cdot p_{k+2}(0)^*\cdot W0(0)\right\}}{\mathrm{Re}\left\{\sum_{k=0}^{139} p_k(0)\cdot p_{k+2}(0)^*\cdot W0(0)\right\}}\middle|\frac{\sum_{k=143}^{281} p_k(0)\cdot p_{k+2}(0)^*\cdot W0(0)}{\sum_{k=143}^{281} p_k(0)\cdot p_{k+2}(0)^*\cdot W0(0)}\right) + \frac{1}{6}\tan^{-1}\left(\frac{\mathrm{Im}\left\{\sum_{k=0}^{139} p_k(1)\cdot p_{k+2}(1)^*\cdot W0(1)\right\}}{\mathrm{Re}\left\{\sum_{k=0}^{139} p_k(1)\cdot p_{k+2}(1)^*\cdot W0(1)\right\}}\middle|\frac{\sum_{k=143}^{281} p_k(1)\cdot p_{k+2}(1)^*\cdot W0(1)}{\sum_{k=143}^{281} p_k(1)\cdot p_{k+2}(1)^*\cdot W0(1)}\right)\right] & \text{for otherwise} \end{cases}$$

[Equation 2]

where in each segment, $p_k$ refers to a preamble, k refers to a sub-carrier index, m refers to a receiving antenna index, and W0 refers to a predetermined preamble weight.

As can be seen from [Equation 1] and [Equation 2], the preamble linear phase is found by multiplying the phase differences of the preambles received by the receiving antennas, respectively, by the predetermined preamble weight W0, accumulating the phase differences by which the preamble weight has been multiplied per receiving-antenna basis, and then carrying out an arc tangent operation on the accumulated phase differences. In this case, ⅙ is meant that there exist six differences in the preamble sub-carrier index in each segment to find a phase difference. In other words, if the phase differences are calculated by the preambles $p_k$ and $p_{k+2}$, there are six sub-carrier indices between two preamble pilots. The arc tangent operation result is multiplied by ⅙, resulting in the preamble linear phase. Thus, the distance between the preamble pilots for finding the preamble linear phases may vary depending on conditions, and the distance between pilots is not decided. Furthermore, [Equation 1] is advantageous in that it can simplify a hardware structure compared with [Equation 2] since the arc tangent operation is performed once on the phase difference accumulated values with respect to the preambles received by the two receiving antennas.

FIG. 6 is a detailed construction of an embodiment of the pilot linear phase calculator shown in FIG. 4.

Referring to FIG. 6, the pilot linear phase calculator 312 includes a pilot phase difference operator 312a, a pilot phase difference accumulator 312b, and a pilot linear phase operator 312c.

The pilot phase difference operator 312a may be implemented by using first and second pilot phase difference operators (not shown). The first and second pilot phase difference operators calculate a phase difference between pilots received from the same transmitting antenna, of pilots with respect to a plurality of transmitting antennas in the PUSC channel mode, which are respectively included in the received signals transformed in the first and second FFT units 110 and 120. In other words, the first and second pilot phase difference operators calculate a phase difference between the pilots received from the first transmitting antenna TxAnt0 and a phase difference between the pilots received from the second transmitting antenna TxAnt1. The pilot phase difference operator 312a can output a value in which a calculated phase difference is multiplied by a predetermined pilot weight. The pilot weight may have a different value per receiving-antenna or cluster basis. It has been described above that the pilot phase difference operator 312a consists of the first and second pilot phase difference operators, and the first and second pilot phase difference operators calculate the phase differences between the pilots, which are included in the received signals and are received from the same transmitting antenna, respectively. However, the pilot phase difference operator 312a may include one function unit, and the function unit may output a value to which two phase differences are added. The pilot phase difference accumulator 312b may be implemented by using first and second pilot phase difference accumulators (not shown). The first and second pilot phase difference accumulators accumulate the phase differences, respectively, calculated in the first and second pilot phase difference operators, and generate phase difference accumulated values. The pilot phase difference accumulator 312b may include one function unit instead of the two pilot phase difference accumulators and output a value to which two phase difference accumulated values are added. The pilot linear phase operator 312c converts the phase difference accumulated values generated from the pilot phase difference accumulator 312b, that is, the phase difference accumulated value generated from the first pilot phase difference accumulator and the phase difference accumulated value generated from the second pilot phase difference accumulator into pilot linear phases. The pilot linear phase operator 312c converts the phase difference accumulated values into the pilot linear phases by carrying out an arc tangent operation on the phase difference accumulated values, which are generated by the pilot phase difference accumulator 312b. The pilot linear phase operator 312c may include a lookup table in which a phase difference accumulated value and a pilot linear phase (an arc tangent value) corresponding to the phase difference accumulated value are recorded, and may transform the phase difference accumulated value into the pilot linear phase by reference to the lookup table.

FIG. 7 is an embodiment of pilot patterns respectively transmitted from two transmitting antennas. For reference, the pilot patterns of FIG. 7 the DL PUSC mode.

Referring to FIG. 7, a signal transmitted from each transmitting antenna includes a pilot sub-carrier, a data sub-carrier, and a null sub-carrier. It can be seen that the pilot sub-carriers have different pilot patterns. That is, the first transmitting antenna TxAnt0 transmits pilots p0, p3, and the null sub-carriers are placed at portions to which pilots p1, p2 of the second transmitting antenna will be sent. The second transmitting antenna TxAnt1 transmits the pilots p1, p2, and the null sub-carriers are placed at portions to which pilots p0, p3 of the first transmitting antenna will be sent. Thus, if the two pilot patterns shown in FIG. 7 are transmitted, the receiving antennas of the communication terminal receive pilot patterns as shown in FIG. 8.

The above-mentioned pilot linear phase calculator 312 is described in detail below with reference to FIG. 8.

The pilot linear phase calculator 312 can find a pilot linear phase $\theta_{TO\_pil}$ by employing [Equation 3] to [Equation 6] according to an OFDMA symbol index value if a pilot signal of the DL PUSC channel mode as shown in FIG. 8 is received.

In other words, in a cluster unit when the OFDMA symbol index shown in FIG. 8 is 0, 1, 4, 5, 8, 9, 12, 13, 16, 17, 20, 21, a pilot linear phase $\theta 1_{TO\_pil}$ can be found by employing [Equation 3] or [Equation 4]. In a cluster unit when the OFDMA symbol index is 2, 3, 6, 7, 10, 11, 14, 15, 18, 19, 22, 23, a pilot linear phase $\theta 2_{TO\_pil}$ can be found by employing [Equation 5] or [Equation 6].

[Equation 3]
$$\theta 1_{TO\_pil} = \frac{1}{4}\tan^{-1}\frac{\text{Im}\left\{\sum_{c=0}^{Num-1}\sum_{m=0}^{1}\left(\begin{array}{c}p_0(m,c)\cdot\\p_3(m,c)^*\\\frac{p_0(m,c)\cdot}{p_3(m,c)^*}\\W1(m,c)+\\p_2(m,c)\cdot\\p_1(m,c)^*\\\frac{p_2(m,c)\cdot}{p_1(m,c)^*}\\W1(m,c)\end{array}\right)\right\}}{\text{Re}\left\{\sum_{c=0}^{Num-1}\sum_{m=0}^{1}\left(\begin{array}{c}p_0(m,c)\cdot\\p_3(m,c)^*\\\frac{p_0(m,c)\cdot}{p_3(m,c)^*}\\W1(m,c)+\\p_2(m,c)\cdot\\p_1(m,c)^*\\\frac{p_2(m,c)\cdot}{p_1(m,c)^*}\\W1(m,c)\end{array}\right)\right\}}$$

-continued $$\theta 1_{TO\_pil} = \frac{1}{2} \begin{bmatrix} \frac{1}{4}\tan^{-1}\left(\frac{\operatorname{Im}\left\{\sum_{c=0}^{Num-1}\sum_{m=0}^{1} p_0(m,c) \cdot p_3(m,c)^* \cdot W1(m,c)\right\}}{\operatorname{Re}\left\{\sum_{c=0}^{Num-1}\sum_{m=0}^{1} p_0(m,c) \cdot p_3(m,c)^* \cdot W1(m,c)\right\}}\right) + \\ \frac{1}{4}\tan^{-1}\left(\frac{\operatorname{Im}\left\{\sum_{c=0}^{Num-1}\sum_{m=0}^{1} p_2(m,c) \cdot p_1(m,c)^* \cdot W1(m,c)\right\}}{\operatorname{Re}\left\{\sum_{c=0}^{Num-1}\sum_{m=0}^{1} p_2(m,c) \cdot p_1(m,c)^* \cdot W1(m,c)\right\}}\right) \end{bmatrix}$$

[Equation 4]

$$\theta 2_{TO\_pil} = \frac{1}{12}\tan^{-1}\frac{\operatorname{Im}\left\{\sum_{c=0}^{Num-1}\sum_{m=0}^{1}\left(\frac{p_0(m,c) \cdot p_3(m,c)^*}{|p_0(m,c) \cdot p_3(m,c)^*|} W1(m,c) + \frac{p_2(m,c) \cdot p_1(m,c)^*}{|p_2(m,c) \cdot p_1(m,c)^*|} W1(m,c)\right)\right\}}{\operatorname{Re}\left\{\sum_{c=0}^{Num-1}\sum_{m=0}^{1}\left(\frac{p_0(m,c) \cdot p_3(m,c)^*}{|p_0(m,c) \cdot p_3(m,c)^*|} W1(m,c) + \frac{p_2(m,c) \cdot p_1(m,c)^*}{|p_2(m,c) \cdot p_1(m,c)^*|} W1(m,c)\right)\right\}}$$

[Equation 5]

$$\theta 2_{TO\_pil} = \frac{1}{2} \begin{bmatrix} \frac{1}{12}\tan^{-1}\left(\frac{\operatorname{Im}\left\{\sum_{c=0}^{Num-1}\sum_{m=0}^{1} p_0(m,c) \cdot p_3(m,c)^* \cdot W1(m,c)\right\}}{\operatorname{Re}\left\{\sum_{c=0}^{Num-1}\sum_{m=0}^{1} p_0(m,c) \cdot p_3(m,c)^* \cdot W1(m,c)\right\}}\right) + \\ \frac{1}{12}\tan^{-1}\left(\frac{\operatorname{Im}\left\{\sum_{c=0}^{Num-1}\sum_{m=0}^{1} p_2(m,c) \cdot p_1(m,c)^* \cdot W1(m,c)\right\}}{\operatorname{Re}\left\{\sum_{c=0}^{Num-1}\sum_{m=0}^{1} p_2(m,c) \cdot p_1(m,c)^* \cdot W1(m,c)\right\}}\right) \end{bmatrix}$$

[Equation 6]

where p0, p3 refer to pilots transmitted from the second transmitting antenna TxAnt1, p1, p2 refer to pilots transmitted from the first transmitting antenna TxAnt0, m refers to a receiving antenna index, c refers to a cluster index, W1 refers to a predetermined pilot weight, and Num refers to a value previously decided by a simulation. The Num value may be set high when channel conditions are worse, preferably a maximum of 720 or less.

As can be seen from [Equation 3] to [Equation 6], the pilot linear phase $\theta 1_{TO\_pil}$ or $\theta 2_{TO\_pil}$ can be found by multiplying a phase difference between the pilots p0, p3 or p1, p2, transmitted from the same transmitting antenna, by a predetermined pilot weight W1, accumulating phase differences by which the pilot weight is multiplied per receiving-antenna basis, and then carrying out an arc tangent operation on the accumulated phase differences. In [Equation 3] and [Equation 5], ¼ and 1/12 are meant that there exist four and twelve in the OFDMA sub-carrier phase difference between the pilots shown in FIG. 8. It is also evident that if a difference in the OFDMA sub-carrier between the pilots received from the same transmitting antenna varies, the values ¼ and 1/12 shown in [Equation 4] and [Equation 6] are changed. Meanwhile, in the case of [Equation 3] and [Equation 5], there is an advantage in that a hardware structure can be simplified because the arc tangent operation is performed only once on the phase difference accumulated values with respect to the pilots of the DL PUSC channel mode, which are received from the two receiving antennas. Further, in the case of [Equation 4] and [Equation 6], there is an advantage in that an accurate linear phase value can be found by calculating an arc tangent operation with respect to each phase difference accumulated value.

If generalizing the above description, the pilot linear phase $\theta_{TO\_pil}$ shown in FIG. 8 can be expressed in [Equation 7] or [Equation 8].

$$\theta_{TO\_pil} = \frac{1}{b}\tan^{-1}\frac{\operatorname{Im}\left\{\sum_{c=0}^{Num-1}\sum_{m=0}^{1}\left(\frac{p_0(m,c) \cdot p_3(m,c)^*}{|p_0(m,c) \cdot p_3(m,c)^*|} W1(m,c) + \frac{p_2(m,c) \cdot p_1(m,c)^*}{|p_2(m,c) \cdot p_1(m,c)^*|} W1(m,c)\right)\right\}}{\operatorname{Re}\left\{\sum_{c=0}^{Num-1}\sum_{m=0}^{1}\left(\frac{p_0(m,c) \cdot p_3(m,c)^*}{|p_0(m,c) \cdot p_3(m,c)^*|} W1(m,c) + \frac{p_2(m,c) \cdot p_1(m,c)^*}{|p_2(m,c) \cdot p_1(m,c)^*|} W1(m,c)\right)\right\}}$$

[Equation 7]

$$\theta_{TO\_pil} = \frac{1}{2} \begin{bmatrix} \frac{1}{b}\tan^{-1}\left(\frac{\operatorname{Im}\left\{\sum_{c=0}^{Num-1}\sum_{m=0}^{1} p_0(m,c) \cdot p_3(m,c)^* \cdot W1(m,c)\right\}}{\operatorname{Re}\left\{\sum_{c=0}^{Num-1}\sum_{m=0}^{1} p_0(m,c) \cdot p_3(m,c)^* \cdot W1(m,c)\right\}}\right) + \\ \frac{1}{b}\tan^{-1}\left(\frac{\operatorname{Im}\left\{\sum_{c=0}^{Num-1}\sum_{m=0}^{1} p_2(m,c) \cdot p_1(m,c)^* \cdot W1(m,c)\right\}}{\operatorname{Re}\left\{\sum_{c=0}^{Num-1}\sum_{m=0}^{1} p_2(m,c) \cdot p_1(m,c)^* \cdot W1(m,c)\right\}}\right) \end{bmatrix}$$

[Equation 8]

where b refers to a sub-carrier distance between the pilots transmitted from the same transmitting antenna. That is, the value b is a dynamic value that varies when a value c is changed. For example, the value b may be 4 or 12. From FIG. 8, it can also be seen that the OFDMA symbol index difference is '1'. The OFDMA symbol index difference may have an appropriate value depending on its implementation.

The above time offset estimation unit according to the present invention can estimate a time offset by employing only a preamble, only a pilot signal, or a preamble and a pilot signal in accordance with [Equation 1] to [Equation 8]. That is, when the preamble weight W0 is set to '0', the time offset can be estimated by employing only the pilot signal, and when the pilot weight W1 is set to '0', the time offset can be estimated by employing only the preamble. In this case, the weight value can be set on the basis of channel information, which is measured from the preamble in each receiving antenna, such as Carrier to Interference and Noise Ratio (CINR) information, channel information measured from a pilot or the like.

As described above, if the preamble linear phase $\theta_{TO\_pil}$ and the pilot linear phase $\theta_{TO\_pil}$ are found by the preamble linear phase calculator 311 and the pilot linear phase calculator 312, respectively, the time offset operator 313 calculates or estimates a time offset based on the two values.

That is, as shown in [Equation 9], the time offset is calculated according to a linear phase value Phase_TO to which the two linear phase values are added.

$$Phase\_TO = \theta_{TO\_pre} + \theta_{TO\_pil} \quad \text{[Equation 9]}$$

FIG. 9 is a flowchart illustrating a time offset estimation method according to an embodiment of the present invention, and it is an operational flowchart illustrating a MIMO communication terminal that supports the DL PUSC channel mode in a system based on any one of IEEE 802.16d/e standard, WiBro, and WiMAX.

Referring to FIG. 9, in step S110, time domain signals of a baseband, which are received by the plurality of receiving antennas included in the communication terminal, are transformed into frequency domain signals. The transform of the frequency domain signals can be performed by FFT.

In step S120, a preamble and a pilot are extracted from received signals transformed into the frequency domain.

In step S130, a preamble linear phase is calculated by using the preamble extracted in step S120. In a similar way, in step S140, a pilot linear phase is calculated by using the pilot extracted in step S120. The pilot linear phase is calculated by using pilots received from the same transmitting antenna, of pilots, which are included in the received signals and concerned with a plurality of transmitting antenna.

In step S150, a time offset is operated based on the preamble linear phase and the pilot linear phase calculated in steps S130 and S140. The time offset is used to compensate for a variation in pilots and phase of data.

It has been described above that the step S130 of calculating the preamble linear phase and the step S140 of calculating the pilot linear phase, of the above steps, are performed at the same time. However, one of the two steps may be performed first and the other of the two steps may be then performed.

FIG. 9 is a detailed operational flowchart of an embodiment with respect to the step S130 shown in FIG. 9.

Referring to FIG. 10, in step S132, a phase difference between the preambles included in the received signals, respectively, received by the receiving antennas is calculated. In this case, a value in which the phase difference between the preambles is multiplied by a predetermined preamble weight may be output. The preamble weight may have a different value according to a receiving antenna. The calculated phase difference may be calculated and output per receiving-antenna basis, or a value in which phase differences calculated per receiving-antenna basis are all added may be output.

In step S134, the phase differences calculated in step S132 are accumulated to generate a phase difference accumulated value. In other words, the phase difference between the preambles, respectively, received by the receiving antennas, or a value in which the phase difference between the preambles is multiplied by a preamble weight is accumulated to generate a phase difference accumulated value. The generated phase difference accumulated value may be a value in which phase difference accumulated values with respect to preambles received by all receiving antennas are added, or an accumulated value with respect to a preamble phase difference calculated per receiving-antenna basis may be generated.

In step S136, the phase difference accumulated value generated in step S134 is transformed into a preamble linear phase. That is, a value in which the phase difference accumulated values calculated in step S1134 with respect to the preambles received by all the receiving antennas are added is received or an accumulated value with respect to the preamble phase difference is received per receiving-antenna basis and then transformed into a preamble linear phase. The phase difference accumulated value may be transformed into the preamble linear phase by means of an arc tangent operation. Such transform of the phase difference accumulated value into the preamble linear phase through the arc tangent operation can be performed with reference to a lookup table in which a phase difference accumulated value and a preamble linear phase (an arc tangent value) corresponding to the phase difference accumulated value are recorded.

In the preamble linear phase calculation process including the above steps, when the preamble signal as shown in FIG. 2 is received in the 2×2 MIMO, the preamble linear phase $\theta_{TO\_pre}$ can be found by employing [Equation 1]. The description of [Equation 1] has been given with reference to the time offset estimation unit according to the present invention, and their repeated explanations are omitted.

FIG. 11 is a detailed operational flowchart of an embodiment with respect to the step S140 shown in FIG. 9.

Referring to FIG. 11, in step S142, a phase difference between pilots corresponding to the same transmitting antenna, of pilots, which are respectively received by the receiving antennas and concerned with a plurality of transmitting antenna in the DL PUSC channel mode, is calculated. That is, a phase difference between pilots transmitted from the same transmitting antenna, of pilots transmitted from the plurality of transmitting antennas, is calculated. In this case, a value in which the phase difference between the pilots is multiplied by a predetermined pilot weight can be output. The pilot weight may have a different value per receiving-antenna basis or per cluster basis. The calculated phase difference between the pilots can be calculated per receiving-antenna basis and then output, or a value in which phase differences calculated per receiving-antenna basis are all added can be output.

In step S144, the phase difference calculated in step S142 is accumulated to generate a phase difference accumulated value. In other words, a phase difference between pilots, which are respectively included in received signals of the receiving antennas and transmitted from a plurality of the same transmitting antenna in the DL PUSC channel mode, or a value in which a phase difference between pilots is multiplied by a pilot weight can be accumulated to generate a phase difference accumulated value. The generated phase difference accumulated value can be a value in which the phase difference accumulated values with respect to the pilots received by all the receiving antennas are added, or an accumulated value with respect to the phase difference between the pilots, which is calculated per receiving-antenna basis, can be generated.

In step S146, the phase difference accumulated value generated in step S144 is transformed into a pilot linear phase.

That is, a value in which the pilot phase difference accumulated value calculated per receiving-antenna basis in step S144 is added is received, or the accumulated value with respect to the phase difference between the pilots is received per receiving-antenna basis and then transformed into the pilot linear phase. The phase difference accumulated value can be transformed into the pilot linear phase by means of an arc tangent operation. The transform of the phase difference accumulated value into the pilot linear phase through the arc tangent operation can be carried out with reference to a lookup table in which a phase difference accumulated value and a pilot linear phase arc tangent value corresponding to the phase difference accumulated value are recorded.

In the pilot linear phase calculation process including the above steps, when the pilot signal shown in FIG. 8 is received in the 2×2 MIMO, the pilot linear phase $\theta_{TO\_pil}$ can be found by employing [Equation 3] and [Equation 5] or [Equation 7], or [Equation 4] and [Equation 6] or [Equation 8]. [Equation 3] to [Equation 8] have been described with reference to the time offset estimation unit according to the present invention, and their repeated explanations are omitted.

The carrier frequency offset estimation unit according to the present invention is described in detail below with reference to FIGS. 12 to 15.

As shown in FIG. 12, the carrier frequency offset estimation unit 320 includes a phase difference operator 321, a phase difference accumulator 322, an arc tangent operator 323, a frequency transform operator 324, and an average frequency operator 325.

The phase difference operator 321 calculates a phase difference between pilots (that is, pilot tones), which are included in a pilot transmission unit (cluster) of a frame and transmitted from the same transmitting antenna, of pilots with respect to two transmitting antennas, which are extracted from the pilot extractor 220. The phase difference operator 321 may be implemented by using first and second phase difference operators (not shown). The first phase difference operator calculates a phase difference between pilots transmitted from a first transmitting antenna, of pilots, which are included in a first received signal and concerned with two transmitting antennas, and a phase difference between pilots transmitted from a second transmitting antenna. The second phase difference operator calculates a phase difference between pilots transmitted from a first transmitting antenna, of pilots, which are included in a second received signal and concerned with two transmitting antennas, and a phase difference between pilots transmitted from a second transmitting antenna.

The first and second phase difference operators can output a value in which the calculated phase difference is multiplied by a predetermined weight. The weight may have a different value per receiving-antenna basis or per cluster basis. Further, the weight may be set on the basis of a CINR value.

The phase difference accumulator 322 generates an accumulated value with respect to the phase difference calculated in the phase difference operator 321. The phase difference accumulator 322 may be implemented by using first and second phase difference accumulators (not shown). The first phase difference accumulator generates an accumulated value with respect to the phase difference calculated in the first phase difference operator. The second phase difference accumulator generates an accumulated value with respect to the phase difference calculated in the second phase difference operator. Of course, when the phase difference is multiplied by a weight, a phase difference accumulated value multiplied by the weight is generated.

The arc tangent operator 323 converts the phase difference accumulated value, generated in the phase difference accumulator 322, into a linear phase value by carrying out an arc tangent operation on the phase difference accumulated value. The arc tangent operator 323 may be implemented by using first and second arc tangent operators (not shown). The first arc tangent operator converts the phase difference accumulated value, generated from the first phase difference accumulator, into an arc tangent value. The second arc tangent operator converts the phase difference accumulated value, generated from the second phase difference accumulator, into an arc tangent value. The arc tangent operator may include a lookup table in which a phase difference accumulated value and an arc tangent value (that is, a linear phase value), corresponding to the phase difference accumulated value, are recorded. The phase difference accumulated value can be transformed into the linear phase value with reference to the lookup table.

The frequency transform operator 334 converts the linear phase value of a radian unit into a carrier frequency offset estimated value of a frequency (Hz) unit. In order to prevent measurement error of a carrier frequency offset, which may occur due to an abrupt change of channel conditions, etc., the average frequency operator 325 may be configured additionally.

The average frequency operator 325 generates an average value with respect to a carrier frequency offset estimated value, which is measured every frame of a received signal. A method of generating the average value may include a method of using a loop filter, a method of finding an average value of a carrier frequency offset measured by a terminal during a predetermined frame and so on.

The carrier frequency offset measured this process can experience error correction of an oscillator through an Automatic Frequency Controller (AFC), thus preventing a lowering in the reception performance of a communication terminal.

A linear phase $\theta_{CFO}$ of the carrier frequency offset calculated through the above construction (that is, the linear phase value transformed by the arc tangent operator 323) can be expressed in [Equation 10] or [Equation 11].

$$\theta_{CFO} = \frac{1}{2}\left[\begin{array}{l}\tan^{-1}\left(\dfrac{\operatorname{Im}\left\{\sum\limits_{c=0}^{Num-1}\sum\limits_{m=0}^{1} p_0(m,c)\cdot p_3(m,c)^* \cdot w(m,c)\right\}}{\operatorname{Re}\left\{\sum\limits_{c=0}^{Num-1}\sum\limits_{m=0}^{1} p_0(m,c)\cdot p_3(m,c)^* \cdot w(m,c)\right\}}\right) + \\ \tan^{-1}\left(\dfrac{\operatorname{Im}\left\{\sum\limits_{c=0}^{Num-1}\sum\limits_{m=0}^{1} p_1(m,c)\cdot p_2(m,c)^* \cdot w(m,c)\right\}}{\operatorname{Re}\left\{\sum\limits_{c=0}^{Num-1}\sum\limits_{m=0}^{1} p_1(m,c)\cdot p_2(m,c)^* \cdot w(m,c)\right\}}\right)\end{array}\right] \quad \text{[Equation 10]}$$

-continued $$\theta_{CFO} = \tan^{-1}\left(\frac{\operatorname{Im}\left\{\sum_{c=0}^{Num-1}\sum_{m=0}^{1}\left(\begin{array}{c}\frac{p_0(m,c)\cdot p_3(m,c)^*}{|p_0(m,c)\cdot p_3(m,c)^*|}\cdot\\ w(m,c) +\\ \frac{p_1(m,c)\cdot p_2(m,c)^*}{|p_1(m,c)\cdot p_2(m,c)^*|}\cdot\\ w(m,c)\end{array}\right)\right\}}{\operatorname{Re}\left\{\sum_{c=0}^{Num-1}\sum_{m=0}^{1}\left(\begin{array}{c}\frac{p_0(m,c)\cdot p_3(m,c)^*}{|p_0(m,c)\cdot p_3(m,c)^*|}\cdot\\ w(m,c) +\\ \frac{p_1(m,c)\cdot p_2(m,c)^*}{|p_1(m,c)\cdot p_2(m,c)^*|}\cdot\\ w(m,c)\end{array}\right)\right\}}\right)$$

[Equation 11]

where p0, p3 refer to pilots transmitted from the first transmitting antenna TxAnt0, p1, p2 refer to pilots transmitted from the second transmitting antenna TxAnt1, m refers to a receiving antenna index, c refers to a cluster index, w refers to a predetermined weight, and Num refers to a value decided by a simulation. The Num value may be set high when channel conditions are worse, preferably a maximum of 720 or less.

As can be seen from [Equation 10] and [Equation 11], the linear phase $\theta_{CFO}$ of the carrier frequency offset can be found by multiplying a phase difference between pilots transmitted from the same transmitting antenna, of pilots, which are respectively received by receiving antennas and concerned with two transmitting antennas, by a predetermined weight w, accumulating the phase difference multiplied by the weight per receiving-antenna basis, and then carrying out an arc tangent operation, or multiplying the phase difference with respect to the pilot transmitted from the same transmitting antenna by the weight, finding a value in which the phase difference multiplied by the weight is accumulated per receiving-antenna basis and per cluster basis, and then carrying out an arc tangent operation on the phase difference accumulated value with respect to the pilot transmitted from each transmitting antenna. That is, the linear phase value of the carrier frequency offset can be found by finding an accumulated value with respect to the phase difference between the pilots transmitted from the transmitting antennas and then carrying out the arc tangent operation on each phase difference accumulated value, or finding an accumulated value in which the phase differences between the pilots transmitted from the two transmitting antennas are added and then carrying out the arc tangent operation.

For reference, [Equation 10] is advantageous in that an accurate value of a linear phase can be found by carrying out the arc tangent operation on the phase difference accumulated value of the pilots corresponding to the two transmitting antennas. [Equation 11] is advantageous in that it can simplify a hardware structure since the arc tangent operation is performed only once on the phase difference accumulated value.

The linear phase found by [Equation 10] or [Equation 11] is transformed into a carrier frequency offset estimated value by means of the frequency transform operator 334 and the average frequency operator 335 and the input to the AFC. The carrier frequency offset estimated value input to the AFC can be expressed in [Equation 12].

$$f_{current}[Hz] = f_{previous} + \alpha \cdot Gain \cdot \theta_{CFO}$$

[Equation 12]

where $f_{current}$ refers to a carrier frequency offset estimated value measured at a current frame, $f_{previous}$ refers to a carrier frequency offset estimated value that is calculated on average until a previous frame, Gain refers to a parameter for shifting a phase value of a radian unit to a value of a frequency unit, refers to a filter coefficient when the loop filter is used for an average operation, and $\theta_{CFO}$ refers to the linear phase of a carrier frequency offset.

Meanwhile, the carrier frequency offset estimation unit 320 according to the present invention can be implemented to estimate a carrier frequency offset by employing pilots whose time offset has been compensated for. That is, the carrier frequency offset estimation unit 320 is configured to compensate for a time offset with respect to the pilots, which are transmitted from the two transmitting antennas and are included in the received signals, and to find a carrier frequency offset by employing the pilots whose time offset has been compensated for.

The carrier frequency offset estimated value may be calculated by receiving pilots whose time offset has been compensated for from the time offset compensation unit 410, as shown in FIG. 13. Alternatively, the carrier frequency offset estimated value may be calculated by receiving a time offset estimated value from the time offset estimation unit 310 and then directly compensating for the time offset estimated value, as shown in FIG. 3.

The linear phase $\theta_{CFO}$ (that is, the linear phase value transformed by the arc tangent operator) of the carrier frequency offset, which has been calculated through the above construction, can be expressed in [Equation 13] to [Equation 16].

$$\theta_{CFO} = \tan^{-1}\left\{\frac{\operatorname{Im}\left\{\sum_{c=0}^{Num-1}\sum_{m=0}^{1}p_0(m,c)\cdot p_3(m,c)^*\cdot w(m,c)\right\}}{\operatorname{Re}\left\{\sum_{c=0}^{Num-1}\sum_{m=0}^{1}p_0(m,c)\cdot p_3(m,c)^*\cdot w(m,c)\right\}}\right\}$$

[Equation 13]

$$\theta_{CFO} = \tan^{-1}\left\{\frac{\operatorname{Im}\left\{\sum_{c=0}^{Num-1}\sum_{m=0}^{1}p_1(m,c)\cdot p_2(m,c)^*\cdot w(m,c)\right\}}{\operatorname{Re}\left\{\sum_{c=0}^{Num-1}\sum_{m=0}^{1}p_1(m,c)\cdot p_2(m,c)^*\cdot w(m,c)\right\}}\right\}$$

[Equation 14]

$$\theta_{CFO} = \tan^{-1}\left\{\frac{\operatorname{Im}\left\{\sum_{c=0}^{Num-1}\sum_{m=0}^{1}\left(\frac{p_0(m,c)\cdot p_3(m,c)^*}{|p_0(m,c)\cdot p_3(m,c)^*|}\cdot w(m,c)\right)\right\}}{\operatorname{Re}\left\{\sum_{c=0}^{Num-1}\sum_{m=0}^{1}\left(\frac{p_0(m,c)\cdot p_3(m,c)^*}{|p_0(m,c)\cdot p_3(m,c)^*|}\cdot w(m,c)\right)\right\}}\right\}$$

[Equation 15]

$$\theta_{CFO} = \tan^{-1}\left\{\frac{\operatorname{Im}\left\{\sum_{c=0}^{Num-1}\sum_{m=0}^{1}\left(\frac{p_1(m,c)\cdot p_2(m,c)^*}{|p_1(m,c)\cdot p_2(m,c)^*|}\cdot w(m,c)\right)\right\}}{\operatorname{Re}\left\{\sum_{c=0}^{Num-1}\sum_{m=0}^{1}\left(\frac{p_1(m,c)\cdot p_2(m,c)^*}{|p_1(m,c)\cdot p_2(m,c)^*|}\cdot w(m,c)\right)\right\}}\right\}$$

[Equation 16]

As can be seen from [Equation 13] to [Equation 16], in the state where a time offset has been compensated for the pilots p0, p1, p2, and p3 transmitted from the two transmitting antennas, a linear phase of a carrier frequency offset can be found by carrying out an arc tangent operation on a phase difference accumulated value between pilots transmitted from one transmitting antenna. That is, the linear phase of the carrier frequency offset can be found by multiplying a phase difference between the pilots p0, p3, which have a compensated time offset and are transmitted from the first transmitting antenna, by a weight, and carrying out an arc tangent operation on a phase difference accumulated value, which is generated by accumulating the phase difference, which has been multiplied by the weight, per receiving-antenna basis and per cluster basis. Alternatively, the linear phase of the carrier frequency offset can be found by multiplying a phase difference between the pilots p1, p3, which have a compensated time offset and are transmitted from the second transmitting antenna, by a weight, and carrying out an arc tangent operation on a phase difference accumulated value, which is generated by accumulating the phase difference, which has been multiplied by the weight, per receiving-antenna basis and per cluster basis.

FIG. 14 is a flowchart illustrating a carrier frequency offset estimation method according to an embodiment of the present invention. The carrier frequency offset estimation method of FIG. 14 is configured to estimate a carrier frequency offset by employing a phase difference between pilots transmitted from the same transmitting antenna, of pilots concerned with a plurality of transmitting antennas and received from a plurality of receiving antennas (refer to FIG. 8). The carrier frequency offset estimation method according to the present invention will be described in relation to only the 2×2 MIMO that supports the DL PUSC mode in a system based on any one of IEEE 802.16d/e standard, WiBro, and WiMAX. However, the present invention is not limited to the 2×2 MIMO.

Referring to FIG. 14, in step S210, time domain signals of a baseband, which are received from the first and second receiving antennas included in the communication terminal, are transformed into frequency domain signals. Such transform into the frequency domain signals may be performed through FFT.

In step S220, a phase difference between pilots transmitted from the same transmitting antenna, of pilots received from the first and second receiving antennas, is calculated. That is, a phase difference between pilots transmitted from the first transmitting antenna and a phase difference between pilots transmitted from the second transmitting antenna are calculated through the phase difference operator. In this case, each of the calculated phase differences can be multiplied by a predetermined weight and the phase difference can be calculated on a receiving-antenna basis. The weight may have a different value per receiving-antenna basis or per cluster basis, and the weight may be set on the basis of a CINR value.

In step S230, the phase difference between the pilots transmitted from the first transmitting antenna and the phase difference between the pilots transmitted from the second transmitting antenna are accumulated per receiving-antenna basis and per cluster basis, thereby generating a phase difference accumulated value.

In step S240, an arc tangent operation is performed on the generated phase difference accumulated value in order to transform the phase difference accumulated value into a linear phase value of a carrier frequency offset (that is, an arc tangent value). The arc tangent operator can transform the phase difference accumulated value into the linear phase value with reference to a lookup table in which a phase difference accumulated value and an arc tangent value (a linear phase value) corresponding to the phase difference accumulated value are recorded.

In step S250, the linear phase value having a radian unit is transformed into a carrier frequency offset estimated value of a frequency (Hz) unit. In order to prevent measurement error of a carrier frequency offset, which may occur due to an abrupt change of channel conditions, etc., a process of generating an average value with respect to the carrier frequency offset estimated value may be added additionally.

In other words, in step S260, an average value with respect to a carrier frequency offset estimated value, which is measured every frame of a received signal, can be generated, so that a carrier frequency offset estimated value, which is stable even in a change caused by channel conditions, can be generated. A method of generating the average value with respect to the carrier frequency offset estimated value may include a method of using a loop filter, a method of finding an average value of a carrier frequency offset measured by a terminal during a predetermined frame and so on.

Meanwhile, FIG. 15 is a flowchart illustrating the carrier frequency offset estimation method according to another embodiment of the present invention. The carrier frequency offset estimation method of FIG. 15 further includes the step S215 of compensating for a time offset with respect to pilots before a carrier frequency offset is estimated compared with the carrier frequency offset estimation method of FIG. 14.

In other words, a time offset, which is estimated by employing pilots corresponding to the same transmitting antenna, is compensated for with respect to signals received by the first and second receiving antennas between step S210 and step S215. For a technique for estimating or compensating for a time offset with respect to pilots corresponding to the same transmitting antenna, reference can be made to the above description.

Meanwhile, in relation to FIGS. 14 and 15, in implementing the carrier frequency offset estimation method according to the present invention, the process of estimating the carrier frequency offset with respect to the pilots corresponding to the first transmitting antenna and the process of estimating the carrier frequency offset with respect to the pilots corresponding to the second transmitting antenna can be performed separately. One of the processes may be first performed and the other of the processes may be then performed.

Hereinafter, a time offset/carrier frequency offset estimation and compensation apparatus according to another embodiment of the present invention is described with reference to FIGS. 16 to 21. For reference, in the present embodiment, a type of 2×2 MIMO in which a base station receives a signal of the UL PUSC mode, which is transmitted from a communication terminal, and estimates a time offset and a carrier frequency offset, as shown in FIG. 16, is described. However, the present embodiment is not limited to the type of FIG. 16, and may be applied to a downlink.

Referring to FIG. 16, a communication terminal MS, that is, a transmitting side of a wireless communication system transmits pilot patterns pilot_A, pilot_B having different patterns through two transmitting antennas TxAnt0, TxAnt1, and a base station BS, that is, a receiving side thereof receives received signals through two receiving antennas RxAnt0, RxAnt1.

FIG. 17 is a view illustrating pilot patterns of the UL PUSC mode in the 2×2 MIMO. FIG. 17a is a view time offset and a carrier frequency offset in one tile, and FIG. 17b shows the pilot patterns pilot_A, pilot_B transmitted from the respective transmitting antennas in the 2×2 MIMO.

Referring to FIG. 17a, in the UL PUSC tile, an abscissa axis indicates a symbol index axis and a vertical axis indicates a carrier frequency index axis. Further, P0 to P3 indicate pilots transmitted from the transmitting antennas, and d indicates data. Therefore, carrier frequency offsets, such as
$e^{j\theta_{CFO}}$,
$e^{j2\theta_{CFO}}$,
are generated from the pilot P0 to the symbol index axis (abscissa axis) direction, and time offsets, such as
$e^{j\theta_{TO}}$,
$e^{j2\theta_{TO}}$,
and
$e^{j3\theta_{TO}}$,
are generated from the pilot P0 to the carrier frequency index axis (vertical axis) direction.

Referring to FIG. 17b, the first transmitting antenna TxAnt0 of the communication terminal MS transmits the pilot signal pilot_A having a first pilot pattern, the second transmitting antenna TxAnt1 transmits the pilot signal pilot_B having a second pilot pattern, and the first receiving antenna RxAnt0 and the second receiving antenna RxAnt1 of the base station BS receive all pilot signals transmitted from the two transmitting antennas.

Meanwhile, FIG. 18 shows the construction of a time offset/carrier frequency offset estimation and compensation apparatus according to another embodiment of the present invention.

Referring to FIG. 18, the time offset/carrier frequency offset estimation and compensation apparatus according to the present invention includes a FFT unit 100, a pilot extractor 220, an offset estimation unit 300, an offset compensation unit 400 and so on.

They are described in short. The FFT unit 100 converts a time domain into a frequency domain by performing FFT on received signals (first and second received signals) of a baseband, which are received through the first receiving antenna and the second receiving antenna of the base station. The pilot extractor 220 extracts pilots from the first and second received signals transformed into the frequency domain, and transmits the pilots to the offset estimation unit 300. The offset estimation unit 300 estimates a time offset and/or a carrier frequency offset from the extracted pilots. The offset compensation unit 400 compensates for the estimated time offset and/or carrier frequency offset.

For a detailed description of the constituent elements, reference can be made to the description given with reference to FIG. 3. Thus, the detailed description of the constituent elements is omitted. Another embodiment of the offset estimation unit 300 is described below. For reference, the offset estimation unit 300 that will be described with reference to FIGS. 19 to 21 does not have the structure including the time offset estimation unit 310 and the carrier frequency offset estimation unit 320, as shown in FIG. 3, but may be separated into elements related to time offset estimation and carrier frequency offset estimation.

Referring to FIG. 19, the offset estimation unit 300 according to the present invention includes a time offset and carrier frequency offset linear phase operator (hereinafter, referred to as a "TO/CFO linear phase operator") 330 and a COS and SIN operator 340.

The TO/CFO linear phase operator 330 calculates a phase difference between pilot signals corresponding to the same transmitting antenna, of pilot signals extracted from the pilot extractor 220, and calculates a linear phase of a time offset and a carrier frequency offset. For example, an arc tangent operation can be performed on a phase difference between pilot signals in order to calculate a time offset linear phase $\theta_{TO}$ and a carrier frequency offset linear phase $\theta_{CFO}$.

The COS and SIN operator 340 calculates a time offset compensation value and a carrier frequency offset compensation value by carrying out cosine and sine operations on the time offset linear phase $\theta_{TO}$ and the carrier frequency offset linear phase $\theta_{CFO}$.

FIG. 20 is a detailed construction of an embodiment of the COS and SIN operator. As shown in the drawing, the COS and SIN operator includes a COS and SIN operation module 341 for carrying out the cos and sin operations on the time offset linear phase $\theta_{TO}$ and the carrier frequency offset linear phase $\theta_{CFO}$ to calculate first time offset compensation values $\cos(\theta_{TO})$, $\sin(\theta_{TO})$ and first carrier frequency offset compensation values $\cos(\theta_{CFO})$, $\sin(\theta_{CFO})$, and a multiple angle formula operation module 342 for executing a multiple angle formula multiple angle formula on the first time offset compensation values and the first carrier frequency offset compensation values to calculate second time offset compensation values $\cos(\theta_{TO})$, $\sin(\theta_{TO})$ and second carrier frequency offset compensation values $\cos(2\theta_{CFO})$, $\sin(2\theta_{CFO})$. That is, $\cos(\theta_{TO})$, $\sin(\theta_{TO})$, $\cos(\theta_{CFO})$, and $\sin(\theta_{CFO})$, which will be compensated for through "COS and SIN (Xilinx Cordic)" in the time offset linear phase $\theta_{TO}$ and the carrier frequency offset linear phase $\theta_{CFO}$, are found through the COS and SIN operation module 341, and the remaining compensation values $\cos(2\theta_{TO})$, $\sin(2\theta_{TO})$, $\cos(2\theta_{CFO})$, $\sin(2\theta_{CFO})$, $\cos(3\theta_{TO})$, $\sin(3\theta_{TO})$, $\cos(3\theta_{CFO})$, $\sin(3\theta_{CFO})$, ... are calculated through the multiple angle formula operation module 342. The multiple angle formula operated by the multiple angle formula operation module 342 is the same as that illustrated in [Equation 17]. The multiple angle formula is used to find cos and sin values with respect to a multiple angle through a repetitive loop operation.

$$\sin(n\theta_{TO})=2\sin((n-1)\theta_{TO})\cos(\theta_{TO})-\sin((n-2)\theta_{TO})$$

$$\cos(n\theta_{TO})=2\cos((n-1)\theta_{TO})\cos(\theta_{TO})-\cos((n-2)\theta_{TO})$$

$$\sin(n\theta_{CFO})=2\sin((n-1)\theta_{CFO})\cos(\theta_{CFO})-\sin((n-2)\theta_{CFO})$$

$$\cos(n\theta_{CFO})=2\cos((n-1)\theta_{CFO})\cos(\theta_{CFO})-\cos((n-2)\theta_{CFO}) \quad \text{[Equation 17]}$$

However, the multiple angle formula operated by the multiple angle formula operation module 342 of the present invention is not limited to the above formula illustrated in [Equation 17], but may include any formula known to those having ordinary skill in the art. The calculated time offset compensation value and the calculated carrier frequency offset compensation value are used to compensate for a time offset and a carrier frequency offset in the offset compensation unit 400.

Meanwhile, FIG. 21 shows another embodiment of the offset estimation unit 300 shown in FIG. 18. Referring to FIG. 21, the offset estimation unit 300 according to the present invention includes a time offset phase difference operator 351, a carrier frequency offset phase difference operator 352, a first square root operator 353, and a second square root operator 354.

The time offset phase difference operator 351 calculates a time offset phase difference from pilot signals corresponding to the same transmitting antenna, which are extracted from the pilot extractor 220. In a similar way, the carrier frequency offset phase difference operator 352 calculates a carrier frequency offset phase difference from pilot signals corresponding to the same transmitting antenna, which are extracted from the pilot extractor 220. For instance, in the event that the pilots of the UP PUSC mode illustrated in FIG. 17 are employed, the time offset phase difference operator 351 can output $e^{j3\theta_{TO}}$ (that is, the time offset phase difference), and the carrier frequency offset phase difference operator 352 can output $e^{j2\theta_{CFO}}$ (that is, the carrier frequency offset phase difference).

Further, the first square root operator 353 for finding a one third angle performs an operation, employing a trigonometrical function one third angle formula, on the time offset phase difference $e^{j3\theta_{TO}}$ to find $e^{j\theta_{TO}}$, performs an operation, employing a trigonometrical function 2-multiple angle formula, on the found $e^{j\theta_{TO}}$ to find $e^{j2\theta_{TO}}$, and outputs values $e^{j\theta_{TO}}$,
$e^{j2\theta_{TO}}$,
and
$e^{j3\theta_{TO}}$.

Further, the second square root operator 354 for finding a half angle performs an operation, employing a trigonometrical function half-angle formula, on the carrier frequency offset phase difference $e^{j2\theta_{CFO}}$ to find $e^{j\theta_{CFO}}$, and then outputs values $e^{j\theta_{CFO}}$,
$e^{j2\theta_{CFO}}$.

The following [Equation 18] illustrates the formulas used in the first square root operator 353 and the second square root operator 354.

$$\cos\frac{\theta}{2} = \sqrt{\frac{1+\cos\theta}{2}} \quad \sin\frac{\theta}{2} = \pm\sqrt{\frac{1-\cos\theta}{2}}$$ [Equation 18]

$$\cos\frac{\theta}{3} = \sqrt{\frac{\cos\theta+3}{4}} \quad \sin\frac{\theta}{3} = \sqrt{\frac{\sin\theta-3}{-4}}$$

Further, the time offset compensation value and the carrier frequency offset compensation value are calculated through a method, such as Newton's method, Successive approximation, and Binominal series. The values are employed to compensate for a time offset and a carrier frequency offset in the offset compensation unit 400. Hereinafter, a time offset and carrier frequency offset estimation and compensation method according to another embodiment of the present invention is described with reference to FIGS. 22 to 24.

Referring to FIG. 22, in step S310, time domain signals of a baseband, which are received by the plurality of receiving antennas included in the communication terminal, are transformed into frequency domain signals. Such transform into the frequency domain signals may be performed through FFT. In step S320, pilots are extracted from the received signals transformed into the frequency domain, respectively.

In step S330, a phase difference for time offset estimation (hereinafter, referred to as a "time offset phase difference") and a phase difference for carrier frequency offset estimation (hereinafter, referred to as a "carrier frequency offset phase difference") are calculated by employing pilots transmitted from the same transmitting antenna, of the pilots extracted in step S320.

In step S340, an arc tangent operation is performed on the time offset phase difference and the carrier frequency offset phase difference, which have been calculated in step S330, to calculate a time offset linear phase and a carrier frequency offset linear phase.

In step S350, the COS and SIN operator performs cos and sin operations on the time offset linear phase$_{TO}$ and the carrier frequency offset linear phase$_{CFO}$ to calculate a time offset compensation value $C_{TO}$; $\cos(\theta_{TO})$, $\sin(\theta_{TO})$, $\cos(2\theta_{TO})$, $\sin(2\theta_{TO})$, $\cos(3\theta_{TO})$, $\sin(3\theta_{TO})$, ... and a carrier frequency offset compensation value $C_{CFO}$; $\cos(\theta_{CFO})$, $\sin(\theta_{CFO})$, $\cos(2\theta_{CFO})$, $\sin(2\theta_{CFO})$, $\cos(3\theta_{CFO})$, $\sin(3\theta_{CFO})$, ....

Lastly, in step S360, a time offset and a carrier frequency offset are compensated for by reflecting the calculated time offset compensation values and the calculated carrier frequency offset compensation values to pilots and data.

FIG. 23 is a detailed operational flowchart illustrating an embodiment of the step S350 shown in FIG. 22.

Referring to FIG. 23, in step S352, the COS and SIN operation module performs the cos and sin operations on the time offset linear phase $\theta_{TO}$ and the carrier frequency offset linear phase $\theta_{CFO}$, respectively, to calculate the values $\cos(\theta_{TO})$, $\sin(\theta_{TO})$, $\cos(\theta_{CFO})$, and $\sin(\theta_{CFO})$.

In step S354, the multiple angle formula operation module calculates the time offset compensation value $\theta_{TO}$; $\cos(\theta_{TO})$, $\sin(\theta_{TO})$, $\cos(2\theta_{TO})$, $\sin(2\theta_{TO})$, $\cos(3\theta_{TO})$, $\sin(3\theta_{TO})$, ... and the carrier frequency offset compensation value $C_{CFO}$; $\cos(\theta_{CFO})$, $\sin(\theta_{CFO})$, $\cos(2\theta_{CFO})$, $\sin(2\theta_{CFO})$, $\cos(3\theta_{CFO})$, $\sin(3\theta_{CFO})$, ... by employing the values $\cos(\theta_{TO})$, $\sin(\theta_{TO})$, $\cos(\theta_{CFO})$, and $\sin(\theta_{CFO})$.

Meanwhile, FIG. 24 is a flowchart illustrating a time offset/carrier frequency offset estimation and compensation method according to another embodiment of the present invention.

In step S410, time domain signals of a baseband, which are received by the plurality of receiving antennas included in the communication terminal, are transformed into frequency domain signals. Such transform into the frequency domain signals may be performed through FFT. In step S420, pilots are extracted from the received signals transformed into the frequency domain, respectively. In step S430, a time offset phase difference and a carrier frequency offset phase difference are calculated by employing pilots transmitted from the same transmitting antenna, of the pilots extracted in step S420. In step S440, a time offset compensation value $C_{TO}$ and a carrier frequency offset compensation value $C_{CFO}$ are calculated based on the time offset phase difference and CFO the carrier frequency offset phase difference, which have been calculated in step S430, through trigonometrical function arc minute formulas. For the arc minute formulas applied to the time offset phase difference and the carrier frequency offset phase difference, respectively, reference can be made to the description given with reference to [Equation 18]. Lastly, in step S450, a time offset and a carrier frequency offset are compensated for by reflecting the calculated time offset compensation value and the calculated carrier frequency offset compensation value to pilots and data. The time offset/carrier frequency offset estimation and compensation apparatus and the method thereof according to the present invention have been described so far. The time offset/carrier frequency offset estimation and compensation apparatus according to the present invention may be implemented by using ASIC, a Digital Signal Processor (DSP), a Field-Programmable Gate Array (FPGA), a Programmable Array Logic (PLA), Complex Programmable Logic Devices (CPLD), a Generic Array Logic (GAL) and so on.

Meanwhile, functions used in an apparatus and a method disclosed in the present specification can be embodied in storage media that a computer can read as codes that the computer can read. The storage media that the computer can read, include all sorts of record devices in which data that can be read by a computer system is stored. Examples of the storage media that the computer can read, include ROMs, RAMs, CD-ROMs, magnetic tape, floppy discs, optic data storage devices, etc., and also, include things embodied in the form of carrier wave (e.g., transmission through the internet). Furthermore, the storage media that the computer can read is distributed in a computer system connected with networks. Then, the codes that the computer can read, are stored in the distributed storage media in a distribution scheme, and the codes can be executed in the distribution scheme.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

$$\theta_{TO\_pre} = \begin{cases} \frac{1}{3a}\tan^{-1}\frac{\mathrm{Im}\left\{\sum_{k=0}^{139}\sum_{m=0}^{1}p_k(m)\cdot p_{k+a}(m)^*\cdot W0(m) + \sum_{k=143}^{281}\sum_{m=0}^{1}p_k(m)\cdot p_{k+a}(m)^*\cdot W0(m)\right\}}{\mathrm{Re}\left\{\sum_{k=0}^{139}\sum_{m=0}^{1}p_k(m)\cdot p_{k+a}(m)^*\cdot W0(m) + \sum_{k=143}^{281}\sum_{m=0}^{1}p_k(m)\cdot p_{k+a}(m)^*\cdot W0(m)\right\}} & \text{for Segment 0} \\ \frac{1}{3a}\tan^{-1}\frac{\mathrm{Im}\left\{\sum_{k=0}^{139}\sum_{m=0}^{1}p_k(m)\cdot p_{k+a}(m)^*\cdot W0(m) + \sum_{k=142}^{281}\sum_{m=0}^{1}p_k(m)\cdot p_{k+a}(m)^*\cdot W0(m)\right\}}{\mathrm{Re}\left\{\sum_{k=0}^{139}\sum_{m=0}^{1}p_k(m)\cdot p_{k+a}(m)^*\cdot W0(m) + \sum_{k=142}^{281}\sum_{m=0}^{1}p_k(m)\cdot p_{k+a}(m)^*\cdot W0(m)\right\}} & \text{for otherwise,} \end{cases}$$

wherein, in each segment, $p_k$ represents resents a preamble, k represents a sub-carrier index, m represents a receiving antenna index, W0 represents a predetermined preamble weight, and 3a represents a sub-carrier distance between $p_k$ and $p_{k+a}$.

The invention claimed is:

1. An apparatus for estimating a time offset in a Multiple Input Multiple Output (MIMO) communication system that supports Orthogonal Frequency Division Multiplexing (OFDM) or Orthogonal Frequency Division Multiplexing Access (OFDMA), the apparatus comprising:
a preamble linear phase calculator configured to calculate a preamble linear phase by employing a preamble included in a received signal frame of each of a plurality of receiving antennas;
a pilot linear phase calculator configured to receive signals transmitted from a plurality of transmitting antennas using different pilot patterns through the plurality of receiving antennas, and calculate a pilot linear phase by employing the pilot patterns of the plurality of transmitting antennas, which are received from the receiving antennas, respectively; and
a time offset operator configured to calculate a time offset by employing the calculated preamble linear phase and the calculated pilot linear phase,
wherein the preamble linear phase calculator is configured to calculate the preamble linear phase $\theta_{TO\_pre}$ according to the following equation:

2. The apparatus of claim 1, wherein the preamble linear phase calculator comprises:
a preamble phase difference operator configured to calculate a phase difference with respect to the preamble included in each of the received signal frames;
a preamble phase difference accumulator configured to accumulate the phase difference to generate a phase difference accumulated value; and
a preamble linear phase operator configured to convert the phase difference accumulated value into a preamble linear phase.

3. The apparatus of claim 2, wherein the preamble phase difference operator is configured to output a value in which the calculated phase difference is multiplied by a predetermined preamble weight.

4. The apparatus of claim 1, wherein the preamble received by each of the receiving antennas is received from a predetermined one of the plurality of transmitting antennas.

5. The apparatus of claim 1, wherein the pilot linear phase calculator comprises:
a pilot phase difference operator configured to calculate a phase difference per pilot basis, which is received from the same transmitting antenna, of pilots transmitted from the plurality of transmitting antennas;
a pilot phase difference accumulator configured to accumulate the phase difference to generate a phase difference accumulated value; and
a pilot linear phase operator configured to convert the phase difference accumulated value into a pilot linear phase.

6. The apparatus of claim 5, wherein the pilot phase difference operator is configured to output a value in which the calculated phase difference is multiplied by a predetermined pilot weight.

7. The apparatus of claim 6, wherein the pilot weight has a different value per receiving-antenna basis or per cluster basis.

8. The apparatus of claim 6, wherein the pilot weight is set on the basis of a Carrier to Interference and Noise Ratio (CINR) value.

9. The apparatus of claim 1, wherein the pilot linear phase calculator is configured to calculate the pilot linear phase $\theta_{TO\_pil}$ according to the following equation:

$$\theta_{TO\_pil} = \frac{1}{b}\tan^{-1}\left\{\frac{\operatorname{Im}\left\{\sum_{c=0}^{Num-1}\sum_{m=0}^{1}\left(\begin{array}{c}\frac{p_0(m,c)\cdot p_3(m,c)^*}{|p_0(m,c)\cdot p_3(m,c)^*|}\cdot\\W1(m,c)+\\\frac{p_2(m,c)\cdot p_1(m,c)^*}{|p_2(m,c)\cdot p_1(m,c)^*|}\cdot\\W1(m,c)\end{array}\right)\right\}}{\operatorname{Re}\left\{\sum_{c=0}^{Num-1}\sum_{m=0}^{1}\left(\begin{array}{c}\frac{p_0(m,c)\cdot p_3(m,c)^*}{|p_0(m,c)\cdot p_3(m,c)^*|}\cdot\\W1(m,c)+\\\frac{p_2(m,c)\cdot p_1(m,c)^*}{|p_2(m,c)\cdot p_1(m,c)^*|}\cdot\\W1(m,c)\end{array}\right)\right\}}\right\},$$

wherein p0 and p3 represent pilots transmitted from a second transmitting antenna p1 and p2 represent pilots transmitted from a first transmitting antenna m represents a receiving antenna index, c represents a cluster index, W1 represents a predetermined pilot weight, b represents a sub-carrier distance between pilots transmitted from the same transmitting antenna according to c, and Num represents a value predetermined by a simulation.

10. The apparatus of claim 1, wherein the pilot linear phase calculator is configured to calculate the pilot linear phase $\theta_{TO\_pil}$ according to the following equation:

$$\theta_{TO\_pil} = \frac{1}{2}\left[\frac{1}{b}\tan^{-1}\left(\frac{\operatorname{Im}\left\{\sum_{c=0}^{Num-1}\sum_{m=0}^{1}p_0(m,c)\cdot p_3(m,c)^*\cdot W1(m,c)\right\}}{\operatorname{Re}\left\{\sum_{c=0}^{Num-1}\sum_{m=0}^{1}p_0(m,c)\cdot p_3(m,c)^*\cdot W1(m,c)\right\}}\right) + \frac{1}{b}\tan^{-1}\left(\frac{\operatorname{Im}\left\{\sum_{c=0}^{Num-1}\sum_{m=0}^{1}p_2(m,c)\cdot p_1(m,c)^*\cdot W1(m,c)\right\}}{\operatorname{Re}\left\{\sum_{c=0}^{Num-1}\sum_{m=0}^{1}p_2(m,c)\cdot p_1(m,c)^*\cdot W1(m,c)\right\}}\right)\right],$$

wherein p0 and p3 represent pilots transmitted from a second transmitting antenna p1 and p2 represent pilots transmitted from a first transmitting antenna, m represents a receiving antenna index, c represents a cluster index, W1 represents a predetermined pilot weight, b represents a sub-carrier distance between pilots transmitted from the same transmitting antenna according to c, and Num represents a value predetermined by a simulation.

11. An apparatus for estimating a time offset in a MIMO communication system that supports OFDM or OFDMA, the apparatus comprising:
a preamble linear phase calculator configured to calculate a preamble linear phase by employing a preamble included in a received signal frame of each of a plurality of receiving antennas; and
a time offset operator configured to calculate a time offset by employing the calculated preamble linear phase,
wherein the preamble linear phase calculator is configured to calculate the preamble linear phase $\theta_{TO\_pre}$ according to the following equation:

$$\theta_{TO\_pre} = \begin{cases}\frac{1}{3a}\tan^{-1}\left(\frac{\operatorname{Im}\left\{\sum_{k=0}^{139}\sum_{m=0}^{1}p_k(m)\cdot p_{k+a}(m)^*\cdot W0(m) + \sum_{k=143}^{281}\sum_{m=0}^{1}p_k(m)\cdot p_{k-a}(m)^*\cdot W0(m)\right\}}{\operatorname{Re}\left\{\sum_{k=0}^{139}\sum_{m=0}^{1}p_k(m)\cdot p_{k+a}(m)^*\cdot W0(m) + \sum_{k=143}^{281}\sum_{m=0}^{1}p_k(m)\cdot p_{k+a}(m)^*\cdot W0(m)\right\}}\right) & \text{for Segment 0} \\ \frac{1}{3a}\tan^{-1}\left(\frac{\operatorname{Im}\left\{\sum_{k=0}^{139}\sum_{m=0}^{1}p_k(m)\cdot p_{k+a}(m)^*\cdot W0(m) + \sum_{k=142}^{281}\sum_{m=0}^{1}p_k(m)\cdot p_{k+a}(m)^*\cdot W0(m)\right\}}{\operatorname{Re}\left\{\sum_{k=0}^{139}\sum_{m=0}^{1}p_k(m)\cdot p_{k+a}(m)^*\cdot W0(m) + \sum_{k=142}^{281}\sum_{m=0}^{1}p_k(m)\cdot p_{k+a}(m)^*\cdot W0(m)\right\}}\right) & \text{for otherwise,}\end{cases}$$

wherein, in each segment, $p_k$ represents resents a preamble, k represents a sub-carrier index, m represents a receiving antenna index, W0 represents a predetermined preamble weight, and 3a represents a sub-carrier distance between $p_k$ and $p_{k+a}$.

12. The apparatus of claim 11, wherein the preamble linear phase calculator comprises:
a preamble phase difference operator configured to calculate a phase difference with respect to the preamble included in each of the received signal frames;
a preamble phase difference accumulator configured to accumulate the phase difference to generate a phase difference accumulated value; and
a preamble linear phase operator configured to convert the phase difference accumulated value into a preamble linear phase.

13. The apparatus of claim 12, wherein the preamble phase difference operator is configured to output a value in which the calculated phase difference is multiplied by a predetermined preamble weight.

14. A method of estimating a time offset in a MIMO communication system that supports OFDM or OFDMA, the method comprising:

calculating a preamble linear phase by employing a preamble included in a received signal frame of each of a plurality of receiving antennas;

receiving signals transmitted from a plurality of transmitting antennas using different pilot patterns through the plurality of receiving antennas, and calculating a pilot linear phase by employing the pilot patterns of the plurality of transmitting antennas, which are received from the receiving antennas, respectively; and calculating a time offset by employing the calculated preamble linear phase and the calculated pilot linear phase, wherein the calculating of the preamble linear phase comprises calculating the preamble linear phase $\theta_{TO\_pre}$ according to the following equation:

$$\theta_{TO\_pre} = \begin{cases} \dfrac{1}{3a}\tan^{-1}\left(\dfrac{\mathrm{Im}\left\{\sum\limits_{k=0}^{139}\sum\limits_{m=0}^{1} p_k(m)\cdot p_{k+a}(m)^* \cdot W0(m) + \sum\limits_{k=143}^{281}\sum\limits_{m=0}^{1} p_k(m)\cdot p_{k+a}(m)^* \cdot W0(m)\right\}}{\mathrm{Re}\left\{\sum\limits_{k=0}^{139}\sum\limits_{m=0}^{1} p_k(m)\cdot p_{k+a}(m)^* \cdot W0(m) + \sum\limits_{k=143}^{281}\sum\limits_{m=0}^{1} p_k(m)\cdot p_{k+a}(m)^* \cdot W0(m)\right\}}\right) & \text{for Segment 0} \\[2ex] \dfrac{1}{3a}\tan^{-1}\left(\dfrac{\mathrm{Im}\left\{\sum\limits_{k=0}^{139}\sum\limits_{m=0}^{1} p_k(m)\cdot p_{k+a}(m)^* \cdot W0(m) + \sum\limits_{k=142}^{281}\sum\limits_{m=0}^{1} p_k(m)\cdot p_{k+a}(m)^* \cdot W0(m)\right\}}{\mathrm{Re}\left\{\sum\limits_{k=0}^{139}\sum\limits_{m=0}^{1} p_k(m)\cdot p_{k+a}(m)^* \cdot W0(m) + \sum\limits_{k=142}^{281}\sum\limits_{m=0}^{1} p_k(m)\cdot p_{k+a}(m)^* \cdot W0(m)\right\}}\right) & \text{for otherwise,} \end{cases}$$

wherein, in each segment, $p_k$ represents a preamble, k represents a sub-carrier index, m represents a receiving antenna index, W0 represents a predetermined preamble weight, and 3a represents a sub-carrier distance between $p_k$ and $p_{k+a}$.

15. The method of claim 14, wherein the calculating of the preamble linear phase comprises:
calculating a phase difference with respect to the preamble included in each of the received signal frames;
accumulating the phase difference to generate a phase difference accumulated value; and
converting the phase difference accumulated value into a preamble linear phase.

16. The method of claim 15, wherein the converting of the phase difference accumulated value comprises outputting a value in which the calculated phase difference is multiplied by a predetermined preamble weight.

17. The method of claim 16, wherein the preamble weight is set on the basis of a CINR value.

18. The method of claim 14, wherein the preamble received by each of the receiving antennas is received from a predetermined one of the plurality of transmitting antennas.

19. The method of claim 14, wherein the receiving of the signals transmitted from the plurality of transmitting antennas comprises:
calculating a phase difference per pilot basis, which is received from the same transmitting antenna, of pilots transmitted from the plurality of transmitting antennas;
accumulating the phase difference to generate a phase difference accumulated value; and
converting the phase difference accumulated value into a pilot linear phase.

20. The method of claim 19, wherein the converting of the phase difference accumulated value comprises outputting a value in which the calculated phase difference is multiplied by a predetermined pilot weight.

* * * * *